US012499003B2

(12) United States Patent
Krishnan Rajaram et al.

(10) Patent No.: US 12,499,003 B2
(45) Date of Patent: Dec. 16, 2025

(54) CONFIGURABLE CIRCULAR BUFFER FOR STREAMING MULTIVARIATE ML ESTIMATION

(71) Applicant: ORACLE INTERNATIONAL CORPORATION, Redwood Shores, CA (US)

(72) Inventors: Denesh Kumar Krishnan Rajaram, Kenmore, WA (US); Ruixian Liu, San Diego, CA (US); Guang Chao Wang, San Diego, CA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/408,867

(22) Filed: Jan. 10, 2024

(65) Prior Publication Data

US 2025/0225018 A1 Jul. 10, 2025

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0727* (2013.01); *G06F 11/0769* (2013.01);
(Continued)

(58) Field of Classification Search
CPC ............... G06F 11/079; G06F 11/0727; G06F 11/0769; G06F 11/30; G06F 11/3442; G06N 20/00
See application file for complete search history.

(56) References Cited

U.S. PATENT DOCUMENTS

| 4,686,655 A | 8/1987 | Hyatt |
| 7,020,802 B2 | 3/2006 | Gross et al. |

(Continued)

FOREIGN PATENT DOCUMENTS

| CN | 109934412 A | 6/2019 |
| CN | 113986150 A | 1/2022 |

(Continued)

OTHER PUBLICATIONS

Gross, Kenny, Oracle Labs; MSET2 Overview: "Anomaly Detection and Prediction" Oracle Cloud Autonomous Prognostics; p. 1-58; Aug. 8, 2019.

(Continued)

*Primary Examiner* — Jonathan D Gibson
(74) *Attorney, Agent, or Firm* — Kraguljac Law Group LLC

(57) ABSTRACT

Systems, methods, and other embodiments associated with automatic configuration of a circular buffer for ingesting a stream and generating ML estimates in real-time are described. In one embodiment, an example method includes loading a stream of multivariate time series observations into a circular buffer at a real-time pace of input from a target asset. The circular buffer is configured with a buffer configuration that specifies buffer length and choice of arrangement as a single-buffer or dual-buffer. The method then adjusts the buffer configuration until generation of machine learning estimates of the multivariate time series observations that are in the circular buffer satisfies a threshold test for generation at the real-time pace. And, at the real time pace, the method loads additional multivariate time series observations into the circular buffer that is in the adjusted configuration and generates additional machine learning estimates of the additional multivariate time series observations.

20 Claims, 6 Drawing Sheets

(51) Int. Cl.
*G06F 11/30* (2006.01)
*G06F 11/34* (2006.01)
*G06N 20/00* (2019.01)

(52) U.S. Cl.
CPC .......... *G06F 11/30* (2013.01); *G06F 11/3442* (2013.01); *G06N 20/00* (2019.01)

(56) References Cited

U.S. PATENT DOCUMENTS

| | | |
|---|---|---|
| 7,191,096 B1 | 3/2007 | Gross et al. |
| 7,281,112 B1 | 10/2007 | Gross et al. |
| 7,292,659 B1 | 11/2007 | Gross et al. |
| 7,391,835 B1 | 6/2008 | Gross et al. |
| 7,542,995 B2 | 6/2009 | Thampy et al. |
| 7,573,952 B1 | 8/2009 | Thampy et al. |
| 7,613,576 B2 | 11/2009 | Gross et al. |
| 7,613,580 B2 | 11/2009 | Gross et al. |
| 7,702,485 B2 | 4/2010 | Gross et al. |
| 7,869,977 B2 | 1/2011 | Lewis et al. |
| 8,055,594 B2 | 11/2011 | Dhanekula et al. |
| 8,069,490 B2 | 11/2011 | Gross et al. |
| 8,150,655 B2 | 4/2012 | Dhanekula et al. |
| 8,200,991 B2 | 6/2012 | Vaidyanathan et al. |
| 8,214,682 B2 | 7/2012 | Madyanathan et al. |
| 8,275,738 B2 | 9/2012 | Gross et al. |
| 8,341,759 B2 | 12/2012 | Gross et al. |
| 8,365,003 B2 | 1/2013 | Gross et al. |
| 8,543,346 B2 | 9/2013 | Gross et al. |
| 9,514,213 B2 | 12/2016 | Wood et al. |
| 9,933,338 B2 | 4/2018 | Noda et al. |
| 10,015,139 B2 | 7/2018 | Gross et al. |
| 10,452,510 B2 | 10/2019 | Gross et al. |
| 10,496,084 B2 | 12/2019 | Li et al. |
| 10,860,011 B2 | 12/2020 | Gross et al. |
| 10,929,776 B2 | 2/2021 | Gross et al. |
| 11,042,428 B2 | 6/2021 | Gross et al. |
| 11,055,396 B2 | 7/2021 | Gross et al. |
| 11,255,894 B2 | 2/2022 | Wetherbee et al. |
| 11,392,786 B2 | 7/2022 | Gross et al. |
| 11,513,718 B2* | 11/2022 | Liu .................... G06F 3/067 |
| 12,045,591 B2* | 7/2024 | Sheeley ............... G06F 3/0635 |
| 2008/0140362 A1 | 6/2008 | Gross et al. |
| 2008/0252309 A1 | 10/2008 | Gross et al. |
| 2008/0252441 A1 | 10/2008 | McElfresh et al. |
| 2008/0256398 A1 | 10/2008 | Gross et al. |
| 2009/0099830 A1 | 4/2009 | Gross et al. |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0161525 A1 | 6/2010 | Gross et al. |
| 2010/0305892 A1 | 12/2010 | Gross et al. |
| 2010/0306165 A1 | 12/2010 | Gross et al. |
| 2012/0030775 A1 | 2/2012 | Gross et al. |
| 2014/0140209 A1 | 5/2014 | Shihada et al. |
| 2017/0163669 A1 | 6/2017 | Brown et al. |
| 2018/0129975 A1 | 5/2018 | Razin et al. |
| 2018/0349797 A1 | 12/2018 | Garvey et al. |
| 2019/0102718 A1 | 4/2019 | Agrawal |
| 2019/0163719 A1 | 5/2019 | Gross et al. |
| 2019/0196892 A1 | 6/2019 | Matei et al. |
| 2019/0197145 A1 | 6/2019 | Gross et al. |
| 2019/0237997 A1 | 8/2019 | Tsujii et al. |
| 2019/0243799 A1 | 8/2019 | Gross et al. |
| 2019/0286725 A1* | 9/2019 | Gawlick ............. G06F 16/2264 |
| 2019/0324430 A1 | 10/2019 | Herzog et al. |
| 2019/0378022 A1 | 12/2019 | Wang et al. |
| 2020/0125819 A1 | 4/2020 | Gross et al. |
| 2020/0144204 A1 | 5/2020 | Keller, III et al. |
| 2020/0201950 A1 | 6/2020 | Wang et al. |
| 2021/0027152 A1* | 1/2021 | Van Der Made ...... G06N 3/063 |
| 2021/0081573 A1 | 3/2021 | Gross et al. |
| 2021/0158202 A1 | 5/2021 | Backlawski et al. |
| 2021/0174248 A1 | 6/2021 | Wetherbee et al. |
| 2021/0270884 A1 | 9/2021 | Wetherbee et al. |
| 2022/0036158 A1* | 2/2022 | Kuo ........................ G06N 3/08 |
| 2022/0121955 A1 | 4/2022 | Chavoshi et al. |
| 2024/0256947 A1* | 8/2024 | Ding .................... G06N 3/0442 |
| 2024/0281393 A1* | 8/2024 | Lai ........................ G06F 13/28 |
| 2024/0362296 A1* | 10/2024 | Shapiro .................. G06N 3/063 |
| 2024/0370240 A1* | 11/2024 | Sheeley ............... G06F 3/0635 |
| 2025/0225018 A1* | 7/2025 | Krishnan Rajaram ..................... G06F 11/0769 |

FOREIGN PATENT DOCUMENTS

| | | |
|---|---|---|
| CN | 114502979 A | 5/2022 |
| DE | 4447288 A1 | 7/1995 |

OTHER PUBLICATIONS

Gross, K. C. et al., "Application of a Model-Based Fault Detection System to Nuclear Plant Signals," downloaded from https://www.researchgate.net/publication/236463759; Conference Paper: May 1, 1997, 5 pages.

Bergbom et al., "Low-Latency Anomaly Detection Using Stream Processing"; Chalmers University of Technology, Gothenburg, Sweden, 2020, pp. 1-74.

Wang et al., "PoTiA: A Popularity and Timeout Analysis Based SDN Controller Protection Approach; IEEE Access"; vol. 6, Publication date: Oct. 10, 2018, pp. 1-15.

Tao et al., "ECODA: Enhanced Congestion Detection and Avoidance for Multiple Class of Traffic in Sensor Networks", IEEE Transactions on Consumer Electronics, vol. 56, No. 3, Aug. 2010, pp. 1387-1394.

Anton Kalashnikov, "FLIP-183: Dynamic Buffer Size Adjustment", Apache Software Foundation; Last modified Sep. 16, 2022; pp. 1-3.

Khan et al. "Sizing Buffers of IoT Edge Routers", Virginia Tech, 2018, pp. 1-6.

Narasayya et al., Sharing Buffer Pool Memory in Multi-Tenant Relational Database-as-a-Service; Microsoft Resarch, Redmond, WA, Copyright 2015, pp. 1-12.

Amazon Web Services; "AWS IoT Sitewise Features"; 2023—pp. 1-4.

General Electric Company; "Time Series Service Overview", Copyright 2023, pp. 1-2.

Bhspyder; "Double Buffering Optimization #4262"; May 30, 2023; downloaded from github.com/lvgl/lvgl/issues/4262; pp. 1-6.

Sofanit Wubeshet Beyene et al.; "Prioritized Hindsight with Dual Buffer for Meta-Reinforcement Learning"; MDPI, Electronics 2022, 11, 4192; pp. 1-15.

Wilmanns et al.; "Buffer SIzing to Reduce Interference and Increase Throughput of Real-Time Stream Processing Applications", 2015 IEEE; pp. 1-11.

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Whisnant et al.; "Proactive Fault Monitoring in Enterprise Servers," IEEE—International Multiconference in Computer Science & Computer Engineering (Jun. 27-30, 2005) 11 pgs.

US Nuclear Regulatory Commission; "Technical Review of On-Line Monitoring Techniques for Performance Assessment," vol. 1, Jan. 31, 2006.

Gribok, et al.,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.

(56) References Cited

OTHER PUBLICATIONS

Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.
Wald, A, "Sequential Probability Ratio Test for Reliability Demonstration", John Wiley & Sons, 1947.
Abebe Diro et al.; A Comprehensive Study of Anomaly Detection Schemes in IoT Networks Using Machine Learning Algorithms; pp. 1-13; 2021; downloaded from: https://doi.org/10.3390/s21248320.
Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.
Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.

* cited by examiner

CONFIGURABLE CIRCULAR BUFFER FOR STREAMING MULTIVARIATE ML ESTIMATION

BACKGROUND

Multivariate Machine Learning (ML) analyses may be used for anomaly detection in time series data. The throughput and latencies for large-scale ingestion and ML analysis of time series data present a severe challenge for processing of ML analyses in a streaming mode. If the throughput volume of data reaches a point where the processing cannot keep up with real-time streaming, a variety of failures occur. This challenge confines multivariate ML anomaly detection to offline batch processing.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
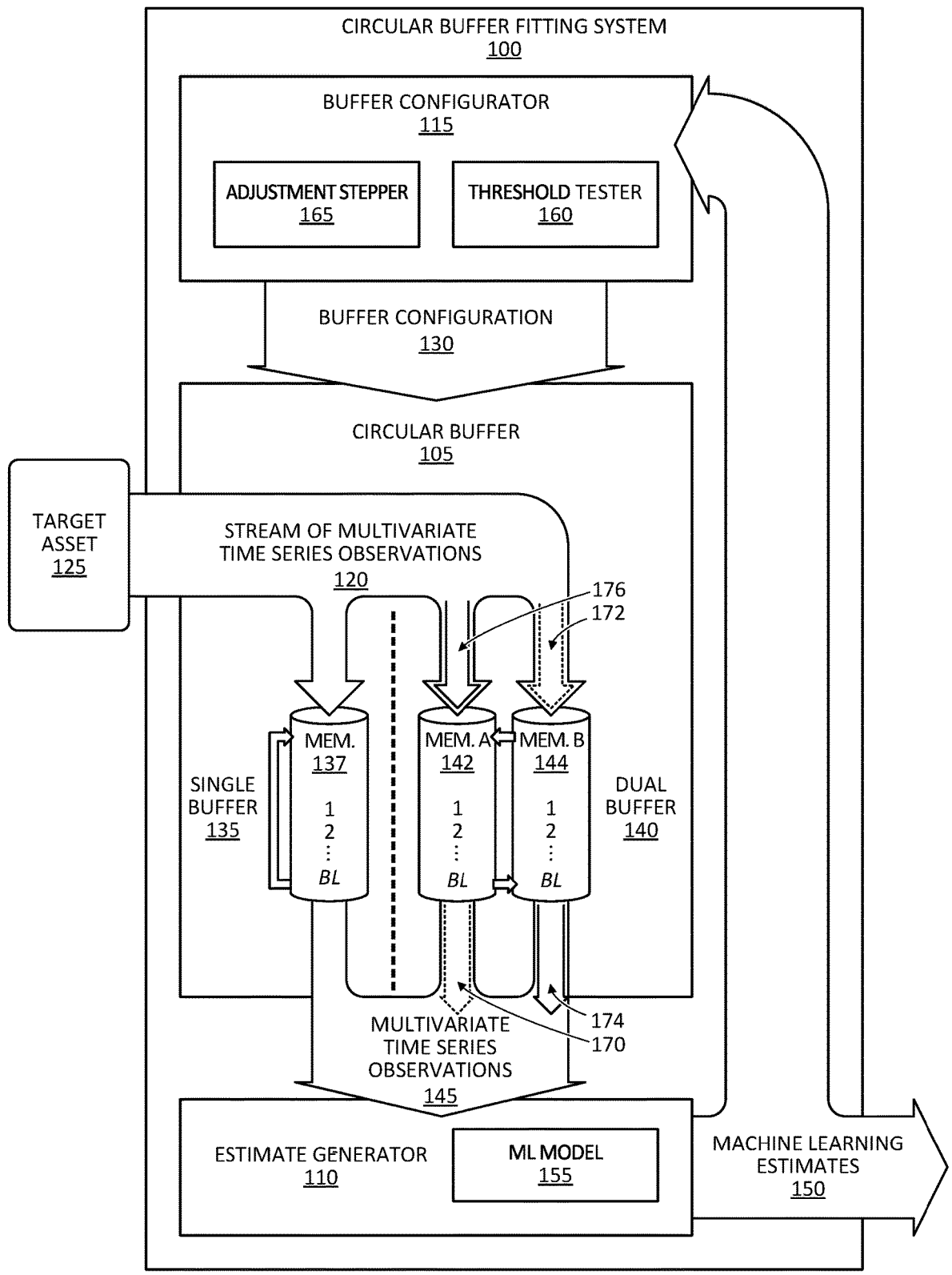
FIG. 1 illustrates one embodiment of a circular buffer fitting system that is associated with automatic configuration of a circular buffer for ingesting a stream and generating ML estimates in real-time.

Systems, methods, and other embodiments are described herein that decomposes latency of streaming ML prognostics and evaluates the decomposed latency with a dual-aspect optimization framework that is configured to choose a configuration of circular buffer for ingesting the stream and generating estimates in real-time. In one embodiment, a configurable buffer system operates to automatically adjust a configuration of a circular buffer to enable machine learning operations to keep pace with high-rate streaming input through the buffer. In one embodiment, the configurable buffer system performs an empirical optimization of (1) buffer length and (2) single-vs. dual-buffer arrangement to reduce estimation latency. In one embodiment, the configurable buffer system tests combinations of buffer length and single- or dual-buffer to find a combination that allows ML estimates to be generated at the pace of the incoming time series signals.

Prior multivariate ML estimation systems are unable to keep pace with higher rates of data ingestion, preventing the use of ML anomaly detection in a real-time streaming mode, and generally restricting the use of ML anomaly detection to batch operation on previously captured signals that are at rest. In one embodiment, use of the configurable buffer system increases throughput of multivariate ML estimation so as to enable extension ML estimation and anomaly detection into real-time processing of high ingestion rate multivariate data. The configurable buffer system may test various configurations to arrive at a configuration that balances the compute latency of multivariate estimation and the real-time pace of data ingestion. For example, a circular buffer fitting system loads a multivariate stream into a circular buffer at a real-time pace, iteratively adjusts a buffer configuration of buffer length and single- or dual-buffer arrangement until generation of ML estimates keeps up with the real-time pace, and deploys the final configuration for real-time monitoring of the multivariate stream.

In one embodiment, the configurable buffer systems and methods described herein are also an improvement to the streaming estimation systems and methods based on a circular double buffer described in U.S. patent application Ser. No. 18/104,506, filed Feb. 1, 2023, titled "CIRCULAR-BUFFER FOR GENERATING MACHINE LEARNING ESTIMATES OF STREAMING OBSERVATIONS IN REAL TIME", having inventors Zejin DING, Guang Chao WANG, and Kenny C. GROSS, and assigned to the present assignee, the entirety of which application is incorporated herein by reference. In particular, the configurable buffer systems and methods herein may automatically fine tune batch length so as to cause streaming ML analyses to have additional speed and accuracy beyond the advancements already provided by the above application.

It should be understood that no action or function described or claimed herein is performed by the human mind. No action or function described or claimed herein can be practically performed in the human mind. Any interpretation that any action or function described or claimed herein can be performed in the human mind is inconsistent with and contrary to this disclosure.

Definitions

As used herein, the term "asset" or "engineering asset" refers to a physical system, structure, device, machine, appliance, apparatus, or other physical construct; or a component or part thereof. Assets may include, for example, manufacturing equipment, aircraft engines, server computers, buildings, vehicles, and a wide variety of other physical objects that generate or are affected by physical phenomena.

As used herein, the terms "stream" and "streaming" refer to transmittal, use, and receipt of data as a steady, continual flow (for example, at a sampling rate), allowing use of portions of the data to occur while the data is being received.

As used herein, the term "real-time" refers to substantially immediate operation that keeps pace with a throughput of a stream of data. In other words, a real-time process happens within a maximum latency that does not cause the throughput of a stream of data to be reduced.

As used herein, the term "latency" refers to a delay or an amount of time taken to process and/or transmit data. As used herein, the term "end-to-end latency" refers to latency incurred from a beginning point of a process to an end point of a process. For example, an end-to-end latency may be from arrival of an observation at a streaming ML estimation system through writing an estimate for the observation to an output stream.

As used herein, the terms "time series" and "time series signal" refer to a data structure in which a series of data points or readings (such as observed or sampled values) are indexed in time order. For convenience, a time series signal may be referred to herein simply as a "signal". In one embodiment, the data points of a time series may be indexed with an index such as a point in time described by a time stamp and/or an observation number. A time series may be considered one "column" or sequence of data points over multiple points in time from one of several sensors used to monitor an asset. For example, a time series is one "column" or sequence of observations over time from one of N variables (such as from one sensor of an aircraft engine, server computer, vehicle, or other asset).

As used herein, the term "vector" refers to a data structure that includes a set of data points or readings (such as observed or sampled values) from multiple time series at one particular point in time, such as a point in time described by a time stamp, observation number, or other index. A vector may therefore be considered one "row" of data points sampled at one point in time from all sensors used to monitor an asset. A vector may also be referred to herein as a "multivariate observation" or "observation" for short. For example, a vector is one row of observations from all N variables (such as from multiple (or all) sensors of an aircraft engine, server computer, vehicle, or other asset).

As used herein, the term "time series database" refers to a data structure that includes multiple time series that share an index (such as a series of points in time, time stamps, time steps, or observation numbers) in common. In one embodiment, the time series database is one form of a collection of time series signals. From another perspective, the term "time series database" refers to a data structure that includes vectors or multivariate observations across multiple time series at a series of points in time. In other words, the time series database is a time series of vectors. As an example, a time series may be considered "columns" of a time series database, and vectors may be considered "rows" of a time series database. A time series database is thus one type of a set of time series readings. For example, a database or collection of sensed amplitudes from sensors of an aircraft engine, server computer, vehicle or other asset may be arranged or indexed in order of a recorded time for the amplitudes, thus making a time series database of the sensed amplitudes.

As used herein, the term "residual" refers to a difference or error between a value (such as a measured, observed, sampled, or resampled value) and an estimate, reference, or prediction of what the value is expected to be. In one embodiment, the residual may be an unsigned magnitude of the difference, also referred to as an "absolute error." For example, a residual may be a difference between an actual, observed value and a machine learning (ML) prediction or ML estimate of what the value is expected to be by an ML model. In one embodiment, a time series of residuals or "residual time series" refers to a time series made up of residual values between a time series of values and a time series of what the values are expected to be.

—Example Circular Buffer Fitting System—

FIG. 1 illustrates one embodiment of a circular buffer fitting system 100 that is associated with automatic configuration of a circular buffer for ingesting a stream and generating ML estimates in real-time. Circular buffer fitting system 100 includes components for identifying a buffer configuration that allows multivariate ML estimation speed to keep pace with real-time data. In one embodiment, components of circular buffer fitting system 100 include circular buffer 105, estimate generator 110, and buffer configurator 115.

In one embodiment, circular buffer 105 is configured to load a stream of multivariate time series observations 120 at a real-time pace of input from a target asset 125. Circular buffer 105 is configured with a buffer configuration 130 that specifies (1) a length BL of the circular buffer 105 and (2) whether the circular buffer 105 is arranged as a single-buffer 135 or dual-buffer 140.

When in the single-buffer 135 arrangement, circular buffer 105 is configured to use a single region of memory 137 that has capacity to store a batch of BL observations. Circular buffer 105 is configured to place observations into positions of region of memory 137 in a loop. When one region of memory 137 becomes full, and a subsequent write operation ins performed, the write is performed on an initial position of region of memory 137, overwriting the oldest data. This single region of memory 137 may be referred to herein as a single buffer.

When in the dual-buffer 140 arrangement, circular buffer 105 is configured to use a pair of regions of memory, region A 142 and region B 144, each of which has capacity to store a batch of BL observations. Circular buffer 105 is configured to place observations into positions of region A 142 and region B 144 in a loop that links the regions 142, 144 end-to-end. When one of region A 142 or region B 144 becomes full, and a subsequent write operation is performed, the write is performed on the other of one of region A 142 or region B 144, overwriting the oldest data. Region A 142 and region B 144 may be referred to herein as a dual buffer or double buffer.

In one embodiment, estimate generator 110 is configured to generate machine learning estimates 150 of the multivariate time series observations 145 that are in the circular buffer 105. In one embodiment, estimate generator 110 includes a machine learning model 155 that has been trained using previous observations to estimate what observations of the target asset 125 are expected to be. For example, the previous observations may be representative of normal, nominal, typical, or otherwise expected measured values for the observations.

When circular buffer 105 is configured in the dual-buffer arrangement 140, the estimate generator 110 is configured to retrieve batches of observations from circular buffer 105 using an alternating-pointer approach. For example, estimate generator 110 is configured to alternate between (1) generating the ML estimates 150 from the multivariate time series observations 145 that are in region A 142 (as indicated at reference 170) in parallel (or contemporaneously) with region B 144 being loaded (as indicated at reference 172), and (2) generating the ML estimates 150 from the multivariate time series observations 145 that are in region B 144 (as indicated at reference 174) in parallel (or contemporaneously) with region A 142 being loaded (as indicated at reference 176).

In one embodiment, buffer configurator 115 is configured to adjust the buffer configuration 130 until generation of the machine learning estimates 150 of the multivariate time series observations 145 that are in the circular buffer 105 satisfies a threshold test. In one embodiment, the threshold test is a check for ML estimate generation at the real-time pace that is evaluated by threshold tester 160. In one embodiment, the adjustment is an incremental change to the buffer configuration that is determined by adjustment stepper 165.

Further details regarding circular buffer fitting system 100 are presented herein. In one embodiment, operations of circular buffer fitting system 100 will be described with reference to methods 200 and 300 of FIGS. 2 and 3. In one embodiment, examples of total latency for real-time ML estimation is shown in sequence diagrams 400 and 500 of FIGS. 4 and 5.

—Example Circular Buffer Fitting Method—

Figure 2:
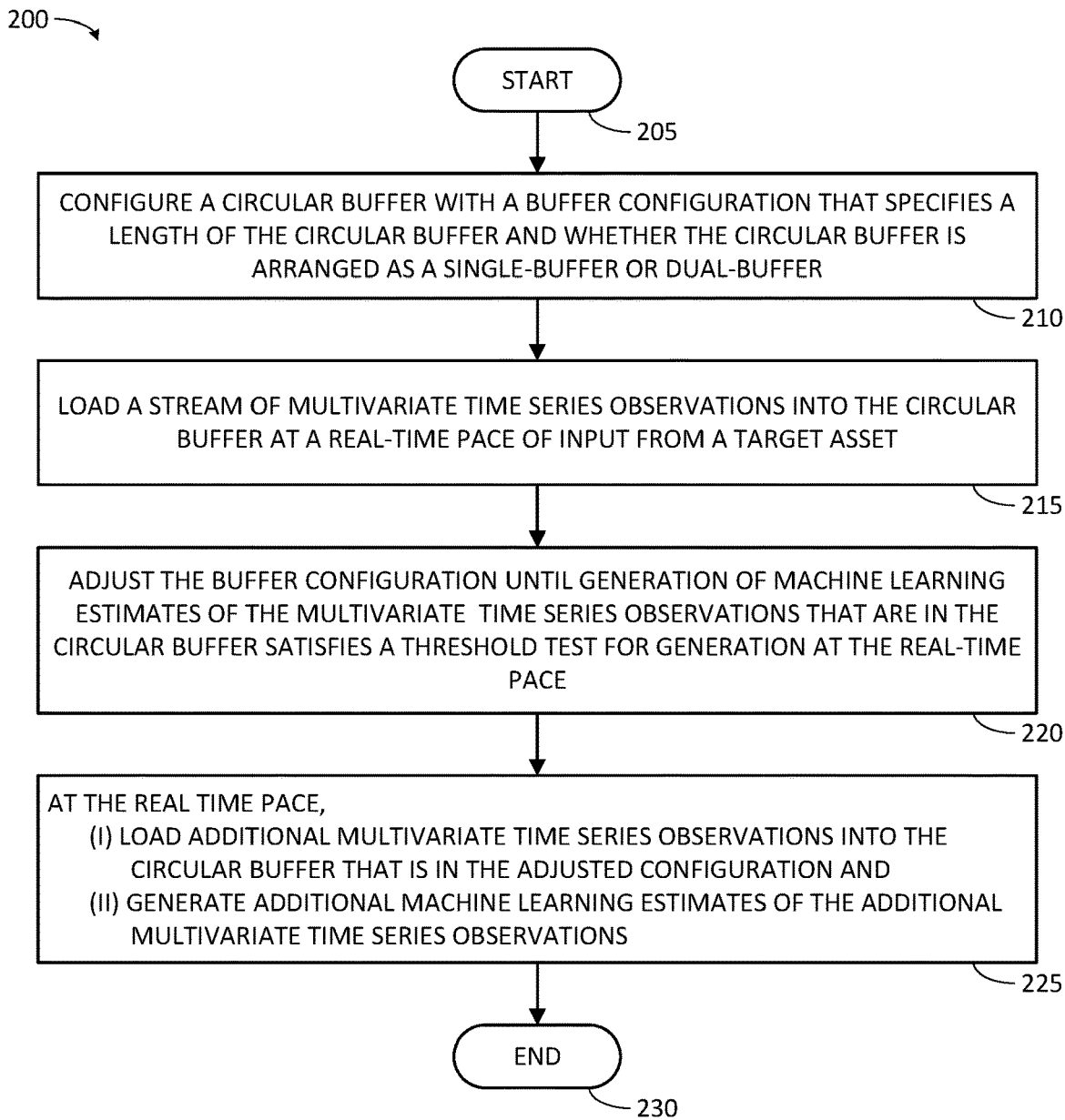
FIG. 2 illustrates one embodiment of a circular buffer fitting method that is associated with automatic configuration of a circular buffer for ingesting a stream and generating ML estimates in real-time.

FIG. 2 illustrates one embodiment of a configurable circular buffer method 200 that is associated with automatic configuration of a circular buffer for ingesting a stream and generating ML estimates in real-time. Circular buffer fitting method 200 is one example process by which a circular buffer may be automatically configured to enable multivariate ML estimation and anomaly detection on live, real-time data. In other words, the circular buffer is fitted to the input pace of the stream and the latencies of the ML analysis.

In one embodiment, as a general overview, circular buffer fitting method 200 loads a stream of multivariate observations into a circular buffer that is in an initial configuration, and tests whether multivariate ML estimates can be produced from the buffer's worth of observations at a speed that can keep up with the input pace of the stream. If not, the configuration of the circular buffer is incrementally adjusted, and the loading and testing is repeated. If so, the circular buffer is used in its current configuration for ongoing ML monitoring of the stream. In one embodiment, the circular buffer fitting method operates to maximize buffer length (and thereby minimize the ratio of input/output latency in overall latency of real-time streaming ML estimation) while keeping missed (i.e., un-estimated) observations below an acceptable minimum. In one embodiment, the circular buffer fitting method finds a balance between buffer lengths that are too long (which may lose observations) and buffer lengths that are too short (which lowers prognostic accuracy of the ML analysis.

In one embodiment, circular buffer fitting method 200 initiates at START block 205 in response to a circular buffer fitting system (such as circular buffer fitting system 100) determining one or more of (i) that a circular buffer fitting system has been instructed to fit a circular buffer to a stream for multivariate ML analysis; (ii) that an instruction to perform circular buffer fitting method 200 has been received (iii) a user or administrator of a circular buffer fitting system has initiated circular buffer fitting method 200; (iv) it is currently a time at which circular buffer fitting method 200 is scheduled to be run; or (v) that circular buffer fitting method 200 should commence in response to occurrence of some other condition. In one embodiment, a computer system configured by computer-executable instructions to execute functions of circular buffer fitting system 100 executes circular buffer fitting method 200. Following initiation at start block 205, circular buffer fitting method 200 continues to block 210.

At block 210, circular buffer fitting method 200 configures a circular buffer with a buffer configuration that specifies a length of the circular buffer and whether the circular buffer is arranged as a single-buffer or dual-buffer. For example, circular buffer fitting method 200 adjusts parameters of a circular buffer to be consistent with values for the parameters that are provided by the buffer configuration.

Generally, a buffer is a region of memory used for temporarily collecting batches of information in advance of processing. For example, a buffer is a data structure. In one embodiment, a buffer includes storage positions for a particular number of observations, also referred to as a batch of observations. A circular buffer is a form of buffer in which, when the buffer is full and a subsequent write is performed, the buffer continues to add data by overwriting the oldest data. In one embodiment, the circular buffer is configurable as to length of batch BL. And, the circular buffer is configurable as to whether the circular buffer is implemented as a single-buffer using one region of memory, or as a dual-buffer using a composite of two regions of memory linked end-to-end.

In one embodiment, the buffer configuration is a data structure that includes values for various buffer configuration parameters. The buffer configuration specifies whether the circular buffer is arranged as a single buffer or dual buffer using the parameter values. For example, the parameters include flag values setting one of either the single-buffer arrangement (SingleFlag) or dual-buffer arrangement (DualFlag) of memory regions for the buffer.

The buffer configuration also specifies length of circular buffer The parameters include a batch length (or buffer length) BL that indicates a capacity of the memory regions used for the circular buffer in the parameter values. For example, batch length BL specifies how many observations are to be included in a batch.

In one embodiment, the buffer configuration may also include a downsampling index that indicates how frequently the streaming value that arrive are to be placed into the circular buffer. For example, the downsampling index may be a power of 2, with a value of 0 indicating no downsampling, a value of 1 indicating sampling every other observation, a value of 2 indicating sampling every fourth observation, a value of 3 indicating sampling every eighth observation and so on. Or, for example, the downsampling index may indicate how many observations are skipped between placing observations into the buffer, with a value of 0 indicating no downsampling, a value of 1 indicating sampling every other observation, a value of 2 indicating sampling every third observation, a value of 3 indicating sampling every fourth observation, and so on. Other increments of the downsampling index may also be used.

In one embodiment, circular buffer fitting method 200 accesses the buffer configuration from memory or storage. Circular buffer fitting method 200 then parses the buffer configuration to extract the values of the parameters. The circular buffer fitting method 200 then reconfigures the circular buffer to operate as specified by the parameters. For example, the circular buffer fitting method overwrites current configuration variables of the circular buffer with the corresponding parsed values.

Where the flag for the single-buffer arrangement SingleFlag is set (and the flag for the dual-buffer arrangement DualFlag is not set) the circular buffer is configured to use one memory region of length BL for the circular buffer. Where the flag for the dual-buffer arrangement DualFlag is set (and the flag for the single-buffer arrangement SingleFlag is not set) the circular buffer is configured to use two memory regions of length BL for the circular buffer. The length of the memory region(s) for the circular buffer is set to the value provided for the batch length BL. In one embodiment, the circular buffer is configured to downsample the incoming stream to the extent indicated by the value of the downsampling index.

Thus, in one embodiment, circular buffer fitting method 200 configures the circular buffer with the buffer configuration to produce a configured circular buffer. The configured circular buffer will, when executed, cause end-to-end latency of streaming ML estimation that are specific to the particular configuration. The buffer configuration may be adjusted, and the circular buffer reconfigured according to the adjusted configuration so that the latency performance of more than one buffer configuration may be examined to identify a configuration that can keep pace in real-time with an incoming stream of time series observations. In one embodiment, the activities of block 210 are performed by buffer configurator 115. Additional detail about configuring the circular buffer is discussed elsewhere herein, for example with reference to blocks 330 and 365 of Method 300.

At block 215, circular buffer fitting method 200 loads a stream of multivariate time series observations into the circular buffer at a real-time pace of input from a target asset. For example, circular buffer fitting method accepts arriving observation data and writes it into the circular buffer as the data arrives. In one embodiment, circular buffer fitting method 200 receives or accesses a continual stream of timestamped values from a set of sensors.

In one embodiment, the multivariate time series observations arrive as a stream of observations of the target asset. In one embodiment, the multivariate time series observations are produced by sensors that monitor physical phenomena of the target asset. The multivariate time series observations record contemporaneous values of a plurality of sensed variables. In one embodiment, the multivariate time series observations may arrive as observation data structures, for example vectors of values for multiple variables that share a particular timestamp.

In one embodiment, the stream of observations is a continual sequence of observation data structures that are transmitted upon generation. The observations arrive separated by intervals. For example, the intervals may be intervals of a sampling rate of the sensors or data acquisition unit that is monitoring the target asset.

In one embodiment, circular buffer fitting method 200 is subscribed to (or otherwise configured to detect) the stream of observations. Circular buffer fitting method 200 detects the arrival observations from the stream. In response to detection of the arrival of an observation, circular buffer fitting method 200 places the observation into memory to initially retain the observation for subsequent transfer into circular double buffer 120.

The circular buffer fitting method 200 loads the retained observations into the circular buffer. The retained observations are retrieved in order of timestamp and written to sequential positions in the circular buffer. For example, each of the retained observations is written, in time-series order, to a next available position in the circular buffer. The next available position in the circular buffer is the position with the oldest data in the circular buffer. Old data in the next available position is overwritten by the observation.

The buffer (or a region of memory that makes up a dual-buffer) becomes full when a number of observations that is equal to the batch length BL have been placed into the buffer. Note, in the dual-buffer arrangement of the circular buffer, when one of the two regions of memory that make up the circular buffer is full and a subsequent write is performed, the data is added to the other of the two regions by overwriting the oldest data in the other region. The writing is therefore transferred to the other of the two regions when the end of one region is reached. The region of memory that was just filled is read by the ML model to generate estimates while the other region is being written to. An intake pointer indicates which of the regions of memory the stream of observations is being written to. An outflow pointer indicates which of the regions of memory is being processed by the ML model. This pair of pointers alternates so that opposite regions of memory (and consequently, distinct batches) are being written and processed in parallel.

In one embodiment, in response to detecting that the stream of time series observations is to be downsampled, the circular buffer fitting method 200 filters the retained observations when transferring the retained observations into the circular buffer. For example, the circular buffer fitting method determines, based on the downsampling index, which of the retained observations are to be placed into the circular buffer, and which are to be discarded. For example, the circular buffer fitting method may determine, based on the downsampling index, that one of every M observations is to be placed into the circular buffer, and that the remaining M−1 observations are to be discarded or filtered out. The circular buffer fitting method will place the one of every M observations into the circular buffer.

The loading process places the observations into the circular buffer at a real-time pace of input from the target asset. In one embodiment, the observations that are to be placed into the circular buffer are placed into the circular buffer sufficiently rapidly so as to cause no backlog of observations to be added to the circular buffer. Where the observations are downsampled, the loading occurs at the real-time pace of input where there is no backlog of the observations kept by the downsampling process.

Thus, in one embodiment, circular buffer fitting method 200 loads a stream of multivariate time series observations into the circular buffer at a real-time pace of input from a target asset by subscribing to a stream of observations, detecting observations as they arrive, storing the observations in memory, and transferring the observation from initial storage in memory to the next available position in the circular buffer until a batch of observations is loaded. In one embodiment, the observations initially stored in memory are downsampled to remove selected observations from those that are transferring the remaining observations to the circular buffer. In one embodiment, the activities of block 215 are performed by circular buffer 105.

At block 220, circular buffer fitting method 200 adjusts the buffer configuration until generation of machine learning estimates of the multivariate time series observations that are in the circular buffer satisfies a threshold test for generation at the real-time pace. The buffer configuration is incrementally adjusted until the configuration allows streaming ML analysis to keep pace with the live stream of observations. In one embodiment, various combinations of buffer length and single/dual-buffer arrangement are tested to find a configuration that maximizes buffer length (and thereby minimizes I/O latency) without violating a test for keeping up with the pace of the stream of observations. In one embodiment, circular buffer fitting method 200 iteratively (1) makes an incremental change to the settings parameters of the buffer configuration, (2) performs a test run of ML estimation with the buffer configuration, and (3) tests the performance of the circular buffer and ML estimation pipeline against the threshold test until the threshold test is satisfied.

In one embodiment, circular buffer fitting method 200 adjusts the buffer configuration by changing the values of parameters in the buffer configuration, and operating the circular buffer as specified by the parameters. In one embodiment, the parameters are incrementally changed in an ordered process, as follows:

(1) First, an initial length BLMax for batch length BL is decremented by a preset amount of buffer length BLStep in the single-buffer arrangement (SingleFlag set to TRUE, DualFlag set to FALSE).

(2) Second, once buffer length BL has been decremented down to a minimum buffer length BLMin (beyond which no further decrement of buffer length BL is permitted) in the single-buffer arrangement, the single-buffer arrangement is switched to the dual-buffer arrangement (SingleFlag set to FALSE, DualFlag set to TRUE), and the length of batch BL is reset to allow BL to be decremented again in the dual-buffer arrangement.

(3) Third, once buffer length BL has again been decremented down to a minimum buffer length BLMin (beyond which no further decrement of buffer length BL is permitted) in the dual-buffer arrangement, the downsampling index is incremented to reduce the effective rate of streaming, the single-buffer arrangement is switched back to the single-buffer arrangement (SingleFlag set to TRUE, DualFlag set to FALSE) and the length of batch BL is reset to allow BL to be decremented again in the single buffer arrangement with a reduced streaming rate.

In one embodiment, the buffer configuration is adjusted stepwise under the above process and tested for performance at each step. The test is a threshold test for generation of ML estimates at the real-time pace. Satisfying the threshold test indicates that, for the buffer configuration under test, generation of ML estimates produces outputs at least at the real-time pace of streaming. In one embodiment, circular buffer fitting method 200 tests each buffer configuration with a plurality of batches of the streaming observations. During the test, estimates are generated by a ML model that has been trained to cause the ML model to produce estimates of what individual variables of an observation is expected to be based on the actual values of other signals in the observation.

In one embodiment, the threshold test is based on a count of observations "lost" or "missed" by ML estimation (ObsMissed). For example, the threshold test may be the count of missed observations ObsMissed remaining below a maximum number of observations permitted to be missed (MaxMissed). In one embodiment, the maximum number of observations permitted to be missed MaxMissed is a small number, for example fewer than 1% of the streamed observations. In one embodiment, the maximum number of observations permitted to be missed MaxMissed is 0.

In one embodiment, to determine the count of missed observations ObsMissed, circular buffer fitting method 200 counts how many observations that arrived in the real-time stream are not provided with a corresponding estimate by the ML estimation process. Note that the count of missed observations ObsMissed is subject to any downsampling-observations discarded by downsampling are not considered to be missed.

In one embodiment, the adjust-test cycle continues until generation of machine learning estimates of the multivariate time series observations that are in the circular buffer satisfies the threshold test for generation at the real-time pace. For example, the stepwise adjustment and testing process may be performed indefinitely until the threshold test indicates that the current configuration allows ML estimates to be generated at the pace of real-time streaming. In short, buffer length BL is decremented stepwise by the amount BLStep for both single- and dual-buffer arrangements for increasing levels of downsampling of the signal, and tested at each step until the test results indicate satisfactory performance of the current buffer configuration.

Thus, in one embodiment, circular buffer fitting method 200 incrementally adjusts a current configuration of the circular buffer and tests generation of machine learning estimates from observations stored in the circular buffer as currently configured for missed observations until the missed observations per test are below a maximum threshold value. The current configuration of the circular buffer when the threshold test is satisfied is finalized and stored, for example in a buffer configuration data structure, to be used for monitoring the stream of observations at the real time pace of the stream. In one embodiment, the activities of block 220 are performed by buffer configurator 115, with the adjustments performed by adjustment stepper 165, and the testing performed by threshold test function 160. Additional detail about the buffer configuration adjustment and testing analysis is discussed elsewhere herein, for example under the heading "Example Buffer Configuration Method" and with reference to block 320.

At block 225, circular buffer fitting method 200 monitors the stream at the real-time pace, by (i) loading additional multivariate time series observations into the circular buffer that is in the adjusted configuration, and (ii) generating further additional machine learning estimates of the additional multivariate time series observations. Once a final configuration of the circular buffer is chosen, the configured circular buffer may be used in ML monitoring of additional observations from the stream on an ongoing basis.

In one embodiment the additional multivariate time series observations are observations that arrive in the stream subsequent to those observations used for determining the buffer configuration. In other words, further multivariate time series observations are loaded into the configured circular buffer on a going-forward basis. The additional multivariate time series observations are thus those that arrive and are loaded to the circular buffer once the final configuration of the buffer has been set. In one embodiment, the status of the configuration of the circular buffer being finalized may be communicated, for example, by an electronic signal or alert, or by setting a "final configuration" flag variable to a value of "TRUE".

In one embodiment, the additional multivariate time series observations may immediately follow in the stream the multivariate time series observations used to determine the final buffer configuration. In one embodiment, the additional multivariate time series observations may be separated from the multivariate time series observations used to determine the final buffer configuration by a gap of one or more observations of the stream. In one embodiment, the additional multivariate time series observations arrive in the stream from the target asset used to determine the final buffer configuration. In one embodiment, the additional multivariate time series observations arrive in another stream from an asset configured similarly to the target asset, including with respect to sensed variables.

The additional multivariate time series observations may be loaded into configured circular buffer in real time, and provided in batches to the trained ML model. In one embodiment, the additional multivariate time series observations may be loaded into the circular buffer as discussed above. For example, an additional observation may arrive in the stream that the circular buffer fitting system is subscribed to, the circular buffer fitting system temporarily stores the additional observation in memory, and the circular buffer fitting system loads the additional observation from temporary storage into the circular buffer at the next available buffer position. The buffer is in the single-buffer arrangement or in the dual-buffer arrangement as specified by the final buffer configuration. The loading will continue until the batch length BL established by the buffer configuration is reached, indicating a full batch for processing by the trained ML model.

The circular buffer fitting method 200 then generates additional machine learning estimates of the additional multivariate time series observations that are in the batch. The full batch is then fed into the trained ML model. The trained ML model then generates estimates for the additional multivariate time series observations that are in the batch. In one embodiment, the estimates are vectors similar to those of the multivariate time series observations, having an estimated value for each variable in the observation. The ML estimates generated by the trained ML model are then streamed out. In one embodiment, the estimates are associated in the output with the corresponding observations of the stream of additional multivariate time series observations to produce a combined output stream of multivariate observations and multivariate estimates of the observations. For example, the estimates may share a time stamp in common with the observation from which the estimate was generated. The combined stream of observations and estimates is written out at the real time pace of arrivals of observations in the input stream.

To monitor the stream at the real-time pace, the combined stream of observations and estimates may then be analyzed by an anomaly detection model such as the sequential probability ratio test (SPRT). The SPRT or other anomaly detection model detects observed values of a signal that deviate anomalously from estimated values of a signal. In this way, the machine learning model is configured to detect incorrect, improper, or otherwise anomalous operation of the target asset in a streaming manner. In response to the anomaly detection model detecting an anomaly, circular buffer fitting method 200 generates an electronic alert that the anomaly was detected in the stream of multivariate time series observations. Additional detail regarding monitoring of the stream by the machine learning model and anomaly detection model is described elsewhere herein, for example under the heading "Overview of Multivariate ML Anomaly Detection".

Thus, in one embodiment, the circular buffer fitting method 200 monitors the stream at the real-time pace by accepting additional observations from a subscribed stream, loading the observations into the circular buffer in its final configuration to create batches of observations that are short enough to allow for ML estimate generation in real time, generating the estimates and streaming the estimates out in real time, comparing the estimates with the observations by the SPRT (or other) anomaly detection model, and, where an anomaly is detected, generating an electronic alert to the presence of the anomaly in real time. Or, where no anomaly is detected, generating an electronic alert that the stream does not include the anomaly in real time. In one embodiment, the activities of block 225 are performed by circular buffer 105 and estimate generator 110.

Thus, in one embodiment, circular buffer fitting method 200 achieves monitoring of the ongoing stream at the real-time pace by automatically configuring the circular buffer to have a batch length and choice of single- or dual-buffer configuration that allow throughput of estimation at the real-time pace of the stream of observations, and using the circular buffer as configured to produce batches that the ML model will process within a maximum latency for the estimates to be streamed out at the real time pace of the stream.

—Further Embodiments of Circular Buffer Fitting Method—

In one embodiment, the circular buffer fitting method incrementally adjusts the buffer configuration and tests the pace of ML estimation under the adjusted configuration in an iterative loop. In one embodiment, therefore, adjusting the buffer configuration (discussed above with reference to block 220) further includes iteratively testing the generation of machine learning estimates with incremental decreases of the length of the circular buffer arranged as the single-buffer and as the dual-buffer until the threshold test is satisfied. In one embodiment, the buffer length is incrementally reduced from a maximum towards a minimum initially in a single-buffer arrangement and then in a dual-buffer arrangement (as discussed below with reference to FIG. 3).

In one embodiment, the stream of observations may arrive too quickly for even a minimum-sized buffer in a dual-buffer arrangement to keep up with the real-time pace of the stream. In such a case, the stream of observations may be downsampled. In one embodiment, therefore, adjusting the buffer configuration (discussed above with reference to block 220) includes further steps when the length of the circular buffer reaches a pre-determined minimum. Adjusting the buffer configuration includes downsampling the stream of multivariate time series observations. And, adjusting the buffer configuration includes resetting the length of the circular buffer to a pre-determined maximum. The adjustment loop may then reiterate through the various configurations of buffer length and single/dual arrangement with the downsampled stream. In one embodiment, circular buffer fitting method 200 detects that the length of the circular buffer has reached a pre-determined minimum. Then, circular buffer fitting method 200 sets the stream of multivariate time series observations to be downsampled (for example by updating or changing the value of the downsampling index). And circular buffer fitting method 200 resets the length of the circular buffer to a pre-determined maximum. In one embodiment, circular buffer fitting method 200 downsamples the stream of multivariate time series by a factor of 2 to reduce the real-time pace of the stream.

In one embodiment, circular buffer fitting method 200 determines that the threshold test is satisfied based on a count of observations that are missed ObsMissed by the estimate generator. In one embodiment, the buffer configurator 100 of circular buffer fitting system 100 is further configured to make this determination. In one embodiment, the threshold test for generation at the real time pace is remaining within a maximum for observations missed MaxMissed. Here, circular buffer fitting method 200 generates the machine learning estimates of the multivariate time series observations that are in the circular buffer. Then, circular buffer fitting method 200 writes the estimates in an output stream as they are generated. Circular buffer fitting method 200 detects a count of the multivariate time series observations that are missed ObsMissed based on absence of estimates that correspond to the multivariate time series observations. And, circular buffer fitting method 200 determines that the threshold for generation at the real-time pace is satisfied based on comparing the count of the multivariate time series observations that are missed ObsMissed with the maximum for observations missed MaxMissed.

In one embodiment, once the buffer configuration allows ML estimation to keep pace with the stream of observations, the ML estimates may be used to alert additional systems to anomalous behavior of the target asset in real-time. For example, circular buffer fitting method 200 may further include detecting an anomaly between additional time series observations and additional machine learning estimates in real time. And, in response to detection of the anomaly, circular buffer fitting method 200 generates an electronic alert in real time.

In one embodiment, the ML estimates are generated by a non-linear, non-parametric regression algorithm configured for generation of multivariate estimates. For example, in one embodiment the estimate generator further comprises a multivariate state estimation technique (MSET) model. The MSET model is configured to generate the machine learning estimates to be consistent with expected values for multivariate observations of the target asset. In one embodiment, the circular buffer fitting method 200 is extended to perform anomaly detection monitoring of ongoing streaming data with a trained ML model once the circular buffer has been fitted to the pace of the stream. For example, circular buffer fitting method 200 may further include training a multivariate state estimation technique model to produce estimates that are consistent with what multivariate observations of the target asset are expected to be. And, circular buffer fitting method 200 further includes generating the machine learning estimates of the multivariate time series observations that are in the circular buffer using the trained multivariate state estimation technique model.

The configured circular buffer can be deployed to monitor the stream from the target asset that was used to establish the fitted pace, or the configuration of the circular buffer may be applied to assets of similar or identical construction to the target asset (and having a similar or identical setup or arrangement of sensors monitoring the asset). In one embodiment, therefore, the additional time series observations are from the target asset. And, in one embodiment, the additional time series observations are from an asset that is of similar construction to the target asset.

In one embodiment, evaluation of whether a current buffer configuration satisfies the threshold test may be performed in parallel with ongoing monitoring using the current buffer configuration. This evaluation may be performed on an ongoing basis (continually, or at intervals) as a check on whether the current buffer configuration is fast enough, or whether the current configuration may be slowed to provide for the higher accuracy of estimates found in higher batch size. For example, an alternative buffer configuration to the current buffer configuration is generated, as discussed above, and compared to the current buffer configuration to determine if the alternative buffer configuration is a change from the current buffer configuration. In one embodiment, where a change from the current buffer configuration is indicated, the configuration of the circular buffer may be updated on the fly by changing the values of the buffer configuration from the current values to the alternative values. The changed configuration will then take effect automatically upon the next load cycle of the circular buffer. This serves as a hedge against changes in streaming frequency, allowing the circular buffer fitting system to automatically adapt to sampling rates which may be non-uniform, or which may be adjusted by other portions of a surveillance system that is monitoring the target asset.

Therefore, in one embodiment, the circular buffer fitting method 200 may further include additional steps performed while loading additional multivariate time series observations into the circular buffer and generating additional machine learning estimates. The circular buffer fitting method 200 further loads the additional multivariate time series observations into an alternative configuration of the circular buffer at the real time pace, for example as described above with reference to block 215. The alternative configuration of the circular buffer is operated in parallel with the adjusted (current) configuration of the circular buffer. The circular buffer fitting method 200 further adjusts the alternative configuration until generation of additional machine learning estimates from the additional multivariate time series observations satisfies the threshold test, for example as described above with reference to block 220. The circular buffer fitting method 200 further compares the alternative configuration to the adjusted (current) buffer configuration, and in response to a difference between the adjusted configuration and the alternative configuration, update the buffer configuration to the alternative configuration. In this way, the monitoring latencies may be automatically adjusted to keep up with the real-time pace.

Discussion and Further Embodiments

Multivariate machine learning for anomaly detection finds applications in predictive maintenance, compute cluster health monitoring, product quality monitoring, and a wide variety of other applications. In general, multivariate ML anomaly detection processes time series readings of multiple variables to detect when one or more of the variables deviates from what is expected, given the values of the other variables. The multivariate ML anomaly detection may perform static or stationary ML prognostics on batches of ML observations. The terms "static" or "stationary" with reference to ML processing indicate that the time series signals are "at rest" rather than "live" or streaming. For example, time series signals that are at rest are stored inside a database such as a data historian database, or in files in object storage.

Performing multivariate ML analyses in a streaming mode desirably keeps pace with real-time arrival of the streamed observations, regardless of number of signals (variables) monitored, and regardless of sampling rates. If the throughput volume of data reaches a point where the processing cannot keep up with real-time streaming, a variety of failures occur. For example, the system performing the ML analyses may crash outright. Or, latencies may build up in an unbounded manner, which can cause time-out exceptions in the upstream data-ingestion hardware/software interface or can cause data to be discarded at the ingestion interface.

A challenge for conversion of static-batch style ML analyses into real-time streaming analyses is that the number of signals in multivariate ML and number of samples per batch both affect the latency of the ML estimation. In particular, these factors cause the ML estimation latency to grow in a complex, non-linear manner that is also dependent on the underlying processing hardware. For example, with ML estimation and anomaly detection algorithmics, such as for the Multivariate State Estimation Technique (MSET), or for other forms of multivariate ML such as neural networks (NNs) and Support Vector Machines (SVMs), determining the end-to-end real-time processing latencies is complicated by the fact that ML compute cost grows quadratically with the number of signals, but linearly with the product of sampling rate and buffer size for the data being analyzed. There is a read latency component for filling the buffer, and a write latency for writing results to an output stream.

Generally, for real-time estimation, the batches for estimation must be sized so that end-to-end throughput rates and cumulative latencies ensure that the streaming computations can keep up with the real time ingestion of incoming times series data. This allows ML estimation outputs to keep up with real-time intake of sensor observations. In one embodiment, the circular buffer fitting system automatically configures the intake to produce batches that keep up with the real-time input pace of an incoming stream, for an arbitrary given number signals and sampling rate of the stream. Thus, in one embodiment, the circular buffer fitting system enables multivariate ML analyses to be extended into a real-time streaming mode. In one embodiment, in the real-time streaming mode, time series observations that are streaming live from sensors can be analyzed in real-time to actuate alerts or alarms at an advanced time, for example, at an earliest possible time.

One feature that enhances the speed of multivariate ML analyses includes capturing the input in a dual (or double) circular buffer with two parallel throughput architectures, rather than capturing the input in a single circular buffer. The dual circular buffer allows the ML model to draw observations for analysis from a buffer opposite from the one used for loading the incoming stream, thereby merging the latencies of input and output with the latencies of the ML analysis. But, the use of a fixed length of buffer for the data-ingestion hardware does not allow for buffer length optimization to squeeze even higher throughputs and even lower compute latencies out of either single- or double-buffer ML operations. Note that the term "buffer length" (or alternatively, "buffer width") refers to a capacity of a buffer data structure measured in number of observations that the buffer can contain contemporaneously.

In one embodiment, the circular buffer fitting system performs a buffer length optimization and latency minimization for conversion of a batch-wise multivariate ML anomaly detection architecture into a real-time streaming architecture. In one embodiment, the circular buffer fitting system further improves throughputs and reduces compute latencies out of single- or double-buffer ML operations for ML anomaly detection algorithms.

In one embodiment, the circular buffer fitting system implements a novel algorithmic framework for real-time latency decomposition, characterization, and minimization for ML Anomaly Detection. In one embodiment, the circular buffer fitting system operates to adapt streaming prognostics for super-high ingestion rates by optimizing the buffer length for streaming ML processing for how much data is loaded into the dual buffers. For example, the circular buffer fitting system employs an empirical dual-optimization approach to learn the complex and nonlinear dependency between compute cost (and associated latency) of the ML estimation, buffer write-in latency, and estimate write-out latency in a wide variety of streaming use cases. In this way, in one embodiment, the circular buffer fitting system improves the pace of ML estimation and anomaly detection for both single-buffer and dual-buffer circular buffer arrangements. In one embodiment, therefore, the circular buffer fitting system improves double-circular buffer ingestion of for multivariate time series analyses.

In one embodiment, the circular buffer fitting system is flexible as to its deployment environment. For example, in one embodiment, the circular buffer fitting method is deployed and implemented in a same cloud container as the ML estimation computations. And, in one embodiment, the circular buffer fitting method is deployed and implemented in a separate container upstream of the ML estimation computations. In various embodiments, the circular buffer fitting method may be performed as a cloud service, as an on-premises service, or as a service of a cloud-edge computing cluster.

In one embodiment, the circular buffer fitting system improves ML estimation by enabling static or batch ML estimation to be re-deployed as a real-time streaming service without modification of previously configured ML estimation tools. In one embodiment, the circular buffer fitting system gains higher throughputs and lower compute latencies for signal-surveillance and anomaly detection use cases. In one embodiment, the circular buffer fitting system optimally determines the buffer length for the circular buffer so that the total end-to-end latency meets the functional requirements for the streaming ML use case. These improvements would not be possible without the capability for dynamically adjusting buffer width for streaming ML processing in the that are offered by the circular buffer fitting system.

—Example Buffer Configuration Method—

Figure 3:
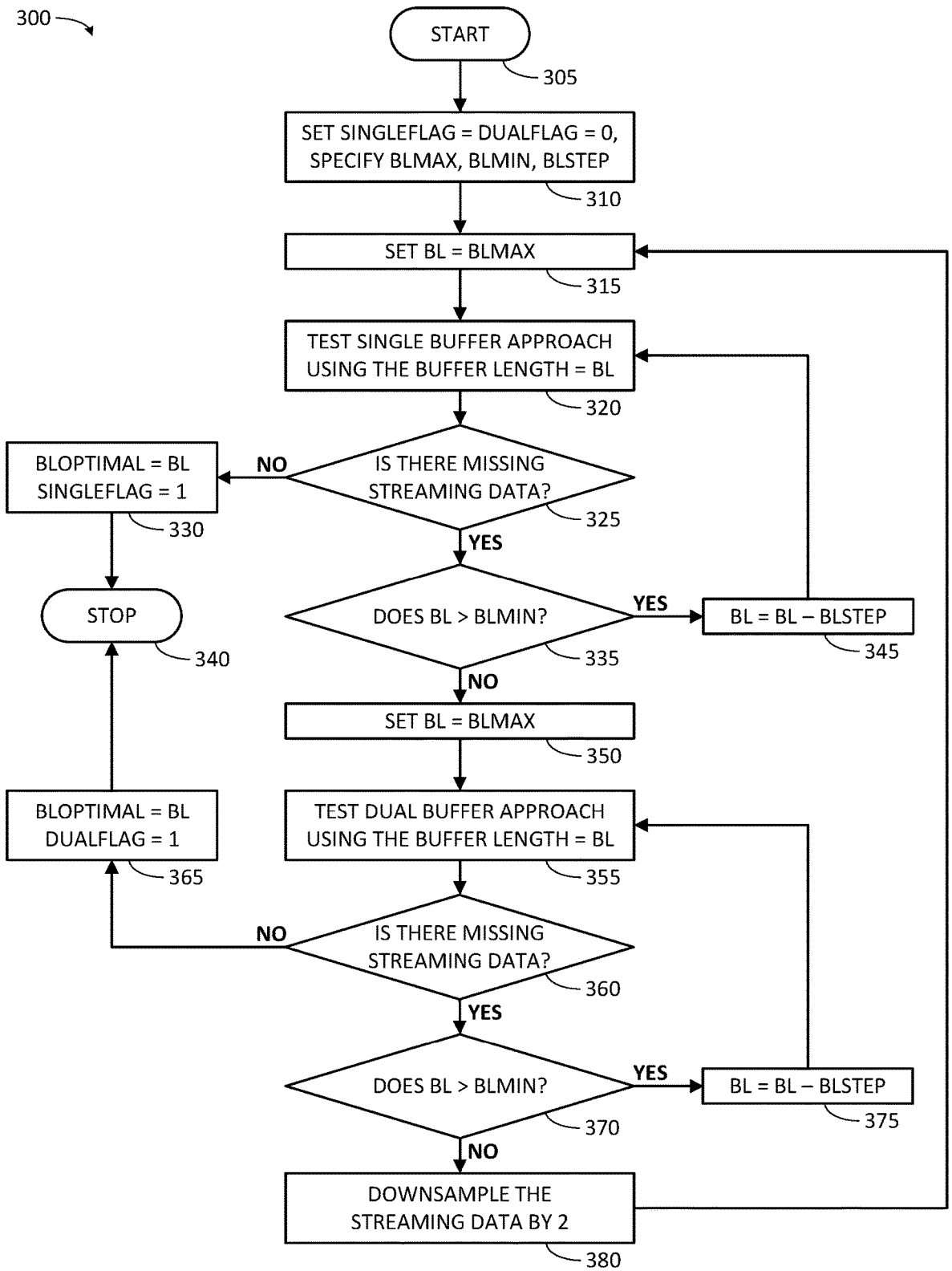
FIG. 3 illustrates one embodiment of a buffer configuration method that is associated with automatic configuration of circular buffer for ingesting a stream and generating ML estimates in real-time.

FIG. 3 illustrates one embodiment of a buffer configuration method 300 that is associated with automatic configuration of circular buffer for ingesting a stream and generating ML estimates in real-time. Buffer configuration method 300 is one example process in which the latencies of various buffer configurations are analyzed to select a configuration that yields a more rapid pace for ML estimation. In one embodiment, buffer configuration method 300 is one specific implementation of blocks 210-220 of circular buffer fitting method 200.

The latency of streaming multivariate ML estimation involves three components: read latency, processing latency, and write latency. Read latency is proportional to the product of the number of signals and the number of observations or rows. The processing latency scales with the number of signals squared times the number of observations (rows). Write latency is proportional to the product of the number of signals and the number of output observations (rows). For a given use case, there can be a wide range of end-to-end latencies depending in a nontrivial way on the length of the circular buffer. In one embodiment, the circular buffer fitting system accurately assesses the end-to-end latency, and does so parametrically as a function of buffer length. (Note that hyperparameters specific to the ML estimation technique are not relevant in the analysis described here.)

In one embodiment, buffer configuration method 300 analyzes the three latency components to choose a configuration of length and single- or dual-buffer arrangement for a circular buffer. The chosen configuration is one configuration that most minimizes the proportion of input/output latency in the total latency, subject to the constraint that a maximum of 0 streaming input observations is lost (MaxMissed=0). More simply, buffer configuration method 300 attempts to make the buffer length as large as possible under the constraint that there is no missed streaming input data. The maximized buffer length (subject to the constraint) may also be referred to herein as an "optimal" buffer length. Maximizing the buffer length decreases the percentage of writing-in and writing-out latency within the total latency. Buffer configuration method 300 attempts to maximize buffer length first for the single-buffer arrangement of the circular buffer, and then for the dual-buffer arrangement, until no observations are dropped. In general, as long as there is little to no missed streaming data, the buffer length is preferred to be larger to boost the overall efficiency by decreasing the percentage of I/O latency within the overall latency.

In one embodiment, buffer configuration method 300 initiates at start block 305 in response to a circular buffer fitting system determining that that buffer configuration method 300 should commence in response to occurrence of a condition, for example in response to the occurrence of one or more of conditions (i)-(v) for initiating circular buffer fitting method 200 above. In one embodiment, a computer system configured by computer-executable instructions to execute functions of circular buffer fitting system 100 executes buffer configuration method 300. Following initiation at start block 305, buffer configuration method 300 continues to block 310.

At block 310, buffer configuration method 300 initiates values for a maximum buffer length, a minimum buffer length, and a buffer length step, as well as sets the choice of single or dual buffer arrangement as undecided. In one embodiment, the choice between arranging the circular buffer for intake as a single-buffer with a linear throughput, or a dual buffer with parallel throughput is indicated by setting flags. For example, the selection of an arrangement may be indicated by setting a corresponding flag to a value of one. Thus, in one embodiment, a SingleFlag indicating a single-buffer arrangement is specified is initiated to a value of 0 (or false), indicating non-selection. And, a DualFlag indicating a dual-buffer arrangement is also initiated to a value of 0 (or false), indicating non-selection.

The maximum buffer length BLMax indicates a pre-specified greatest permitted length for a buffer. In one embodiment, the maximum buffer length BLMax may be based on the capacity of underlying hardware and the size of the observations, for example, a maximum number of observations that will fit in a given available amount of memory. The minimum buffer length BLMin indicates a pre-specified lowest permitted length for a buffer. In one embodiment, the minimum buffer length BLMin is a buffer length beyond which the processing latency for smaller buffer lengths is less than the combined input and output latencies. The buffer length step BLStep indicates a pre-specified increment by which the length of the buffer may be reduced during the execution of buffer configuration method 300. For example, in one embodiment, the step may approximate a percentage of the maximum buffer length. For example, the step may be between 10% and 0.01% of the maximum buffer length, such as 1% of the maximum buffer length.

At block 315, buffer configuration method 300 sets a current buffer length BL to be equal to the maximum buffer length BLMax. This initiates a first testing loop through incrementally decreasing buffer lengths for the single-buffer arrangement.

At block 320, buffer configuration method 300 tests the single buffer approach with the current buffer length BL. The buffer configuration method 300 loads incoming observations into a single circular buffer that has positions for BL total observations. The observations loaded into the buffer form a batch of BL observations for processing with the ML estimation model. The ML model generates and writes out estimates of the observations. In one embodiment, the loading and estimation cycle is performed multiple times, for example 10 or more times.

At decision block 325, buffer configuration method 300 checks to see if any streaming data is missed by the single buffer approach with the current buffer length BL. In other words, the buffer configuration method 300 determines whether any streamed observations were dropped and not provided with an associated estimate. In one embodiment, buffer configuration method 300 checks to determine whether estimates are produced for each of the streamed observations. If estimates are generated for each observation, no streaming data is missed (325: NO), and buffer configuration method 300 proceeds to block 330. If estimates are not generated for each observation, streaming data is missed (325: YES), and buffer configuration method 300 proceeds to decision block 335.

At block 330 (having determined that no streaming data is missed by the current configuration), buffer configuration method 300 chooses the current buffer length BL to be the final "optimal" length, and choose the single buffer approach. Thus, buffer configuration method 300 selects the configuration of the buffer for subsequent monitoring of the stream of observations to have the current buffer length BL, and the single buffer arrangement of the circular buffer for intake. Buffer configuration method 300 proceeds to stop block 340, where buffer configuration method 300 concludes. Buffer configuration method 300 has thus generated a configuration for the circular buffer that satisfies the threshold condition of missing no observations when generating estimates.

At decision block 335 (having determined that streaming data is missed by the current configuration), buffer configuration method 300 checks whether the current buffer length BL still exceeds the minimum buffer length BLMin. Buffer configuration method 300 compares the current buffer length BL to the minimum buffer length BLMin. If the current buffer length BL still exceeds the minimum buffer length BLMin (BL>BLMin: YES), buffer configuration method 300 proceeds to block 345. If the current buffer length BL no longer exceeds the minimum buffer length BLMin (BL>BLMin: NO), buffer configuration method 300 proceeds to block 350.

At block 345 (having determined that the current buffer length BL has not gone below the minimum BLMin), buffer configuration method 300 reduces the current buffer length BL by the buffer length step BLStep. Buffer configuration method 300 then returns to block 315 and re-tests the single buffer approach with the reduced buffer length. Buffer configuration method 300 repeat this loop of testing the single-buffer approach with incrementally decreasing buffer lengths until either (i) no streaming data is missed (at decision block 325), or (ii) the minimum buffer length is reached (at decision block 335).

Where the current buffer length BL reaches the minimum buffer length BLMin, then the single buffer approach cannot be made sufficiently fast enough to keep pace with the real-time stream, and buffer configuration method 300 proceeds to test buffer sizes in the double buffer approach. At block 350, buffer configuration method 300 resets the current buffer length BL to be equal to the maximum buffer length BLMax. This initiates a second testing loop through the incrementally decreasing buffer lengths for the dual-buffer arrangement.

At block 355, buffer configuration method 300 tests the dual buffer approach with the current buffer (batch) length BL, in a manner similar to that described above with reference to block 320. The buffer configuration method 300 loads incoming observations into a dual circular buffer. In one embodiment, the dual circular buffer is made up of two buffers (or more particularly, regions of memory designated as buffers) arranged end-to-end in a circular manner. In one embodiment, each of the two buffers has positions for BL total observations. The observations loaded into one of the component buffers of the circular buffer form a batch of BL observations for processing with the ML estimation model. The ML model generates and writes out estimates of the observations. In one embodiment, the loading and estimation cycle is performed multiple times, for example 10 or more times.

At decision block 360, buffer configuration method 300 checks to see if any streaming data is missed by the dual buffer approach with the current buffer length, in a manner similar to that described above with reference to decision block 325. In short, the system checks whether ML estimates have been generated for the incoming observations, or whether one or more of the incoming observations were missed. If no streaming data is missed (360: NO), buffer configuration method 300 proceeds to block 365. At block 365, buffer configuration method 300 chooses the current buffer length to be the optimal length set in a buffer configuration, and chooses the dual buffer approach as the arrangement of buffers in the buffer configuration. Buffer configuration method 300 then concludes at block 340, having generated a configuration for the circular buffer that satisfies the threshold condition of missing no observations when generating estimates.

If streaming data is missed (360: YES), buffer configuration method 300 proceeds to block 370. At block 370, buffer configuration method 300 compares the current buffer length BL to the minimum buffer length BLMin to confirm whether the current buffer length BL exceeds the minimum buffer length BLMin, in a manner similar to that described above with reference to decisions block 335. If the current buffer length BL exceeds the minimum buffer length BLMin (BL>BLMin: YES), then buffer configuration method 300 proceeds to block 375. At block 375, buffer configuration method 300 reduces the current buffer length BL by the buffer length step BLStep, and returns to block 355 to re-test the dual buffer approach with the lower current buffer length. Buffer configuration method 300 repeats this loop until either no streaming data is missed, or until the minimum buffer length BLMin is reached.

Where the current buffer length BL reaches the minimum buffer length BLMin (BL>BLMin: NO), then the dual buffer approach cannot be made sufficiently fast enough for the incoming data rate. Buffer configuration method 300 proceeds to block 380. At block 380, in one embodiment, buffer configuration method 300 reduces the rate of incoming data to be processed. For example, the buffer configuration method 300 downsamples the incoming data by a factor of 2. That is, the buffer configuration method 300 reconfigures the circular buffer to load every other observation in the incoming stream. Buffer configuration method 300 then returns to block 315 to seek a satisfactory buffer configuration that can handle the downsampled stream.

—Streaming ML Latency Decomposition—

Continuous buffering of streaming data is generally utilized to deal with streaming data. There is some latency between when the results for one computation are output, and when the buffer is refilled for the next computation. Specifically, for every buffer of data, 3 latency components are incurred: read time, processing time (or more informally, "crunch" time), and write time. The single- and dual-buffer arrangements for streaming ML analysis handle these latencies in distinct manners.

An example of the single-buffer approach is explained herein. In a single-buffer arrangement of the circular buffer, the latencies combine sequentially, with each buffer (or batch) of observations incurring the three latency components. With sequential buffer processing, after 100 buffers (batches) of data processed, the streaming ML analysis would have incurred 100 times read, processing, and write time as the end-to-end latency for the 100 buffers. The total latency for the read time and write time components are linearly proportional to the buffer size (i.e., number of observations and signals). The total processing time latencies are both nonlinearly proportional to the number of signals (i.e., the number of variables in the observations) and linearly proportional to the number of observations.

Figure 4:
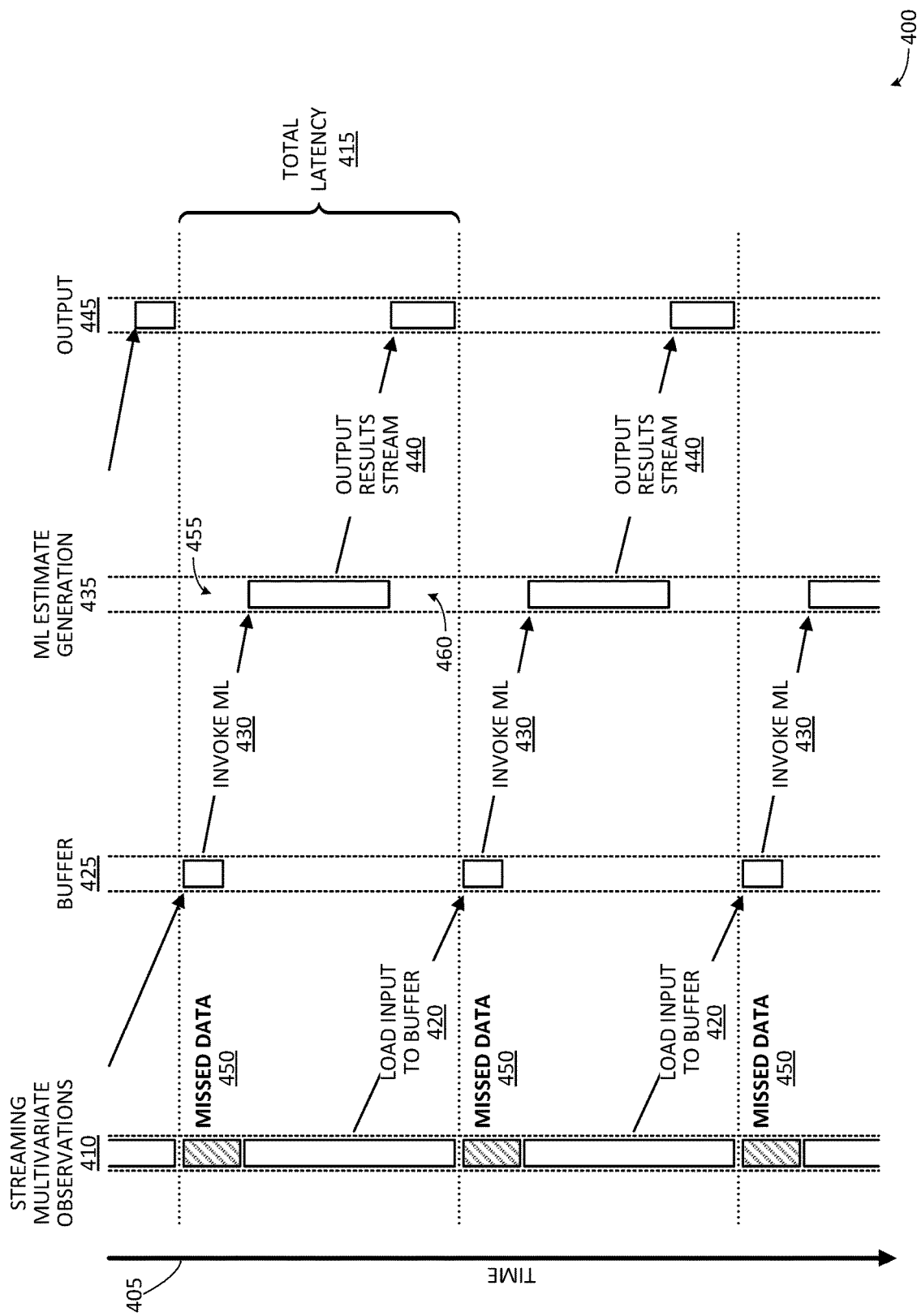
FIG. 4 shows an example demonstration of latencies in a single-buffer approach in a timing chart.

FIG. 4 shows an example demonstration of latencies in a single-buffer approach in a timing chart 400. In timing chart 400, latencies incurred by various parts of single-buffer streaming ML analysis are shown plotted against a time axis 405. Sensor(s) continuously produce streaming multivariate observations 410 for storage in a memory. In a total latency period 415, the system loads the input 420 observations to a buffer 425 in the memory. In other words, the system writes the input data to the buffer 425. In the total latency period 415, the system invokes ML 430 analysis of the buffered observations by an ML estimate generation 435 process. For example, the ML analysis (e.g., a MSET function) uses the buffered observation data to calculate estimates. And, in the total latency period 415, the system outputs a results stream 440 in an output 445 process. For example, both the ML estimates and corresponding input observations are written-out to the output stream.

Each total latency 415 consists of the buffer writing-in time, ML calculation time, and results writing-out time. When total latency 415 is short, a single buffer arrangement of the circular buffer has enough space to store the stream data. However, when total latency 415 is long, the memory in the circular buffer may not have enough space to store the stream data, leading to missed data 450. Thus, single-buffer arrangements can cause data loss. Meanwhile, the calculation resources are not fully utilized as ML estimate generation 435 remains idle during writing-in and out (as shown at references 455 and 460 respectively). Thus, single-buffer arrangements can be an inefficient use of computational resources.

An example of a dual-buffer arrangement of streaming ML analysis is explained herein. In a dual-buffer arrangement of the circular buffer, loading and processing pointers alternate between the dual buffers of the circular buffer. In this arrangement, while one of the dual buffers is being loaded with a batch of observations, another batch of data that is stored in the other of the dual buffers is being subjected to the ML analysis. In this arrangement, the I/O latencies generally combine in parallel with the processing latencies, except for the input latency for an initial buffer (batch) and the output latency for a final buffer (batch). In this alternating-pointer, dual-buffer approach the read and write latencies are hidden, and the content of each buffer may be maximized. With this approach, for 100 buffers (batches) of data, the end-to-end latency for the 100 buffers has 1*read latency, plus 100*processing latency, plus 1*write latency. Hence, 98*(read latency+write latency) are cut out of the end-to-end latency.

In one example of the dual-buffer approach, two compute instances of the ML estimate generation analysis are initiated and executed, so each instance may have a dedicated buffer. In this example, the dedicated buffers of the instances are configured together as the circular buffer. In another example of the dual-buffer approach, one compute instance of the ML estimate generation analysis is initiated and executed, and the ML analysis draws alternately from two buffers that are linked end to end as a circular buffer. The dual buffer arrangement achieves performance improvements even on a single-processor (or single-core) computing system because the dual buffer arrangement hides latencies. The dual buffer arrangement may also achieve further performance improvements when executed on a dual-processor (or dual-core) computing system. In a dual-processor implementation, the first of the two buffers in the dual-buffer configuration of the circular buffer is analyzed by the ML function executing on the first of the two processors, while the second of the two buffers is analyzed by the ML function executing on the second of the two processors.

Figure 5:
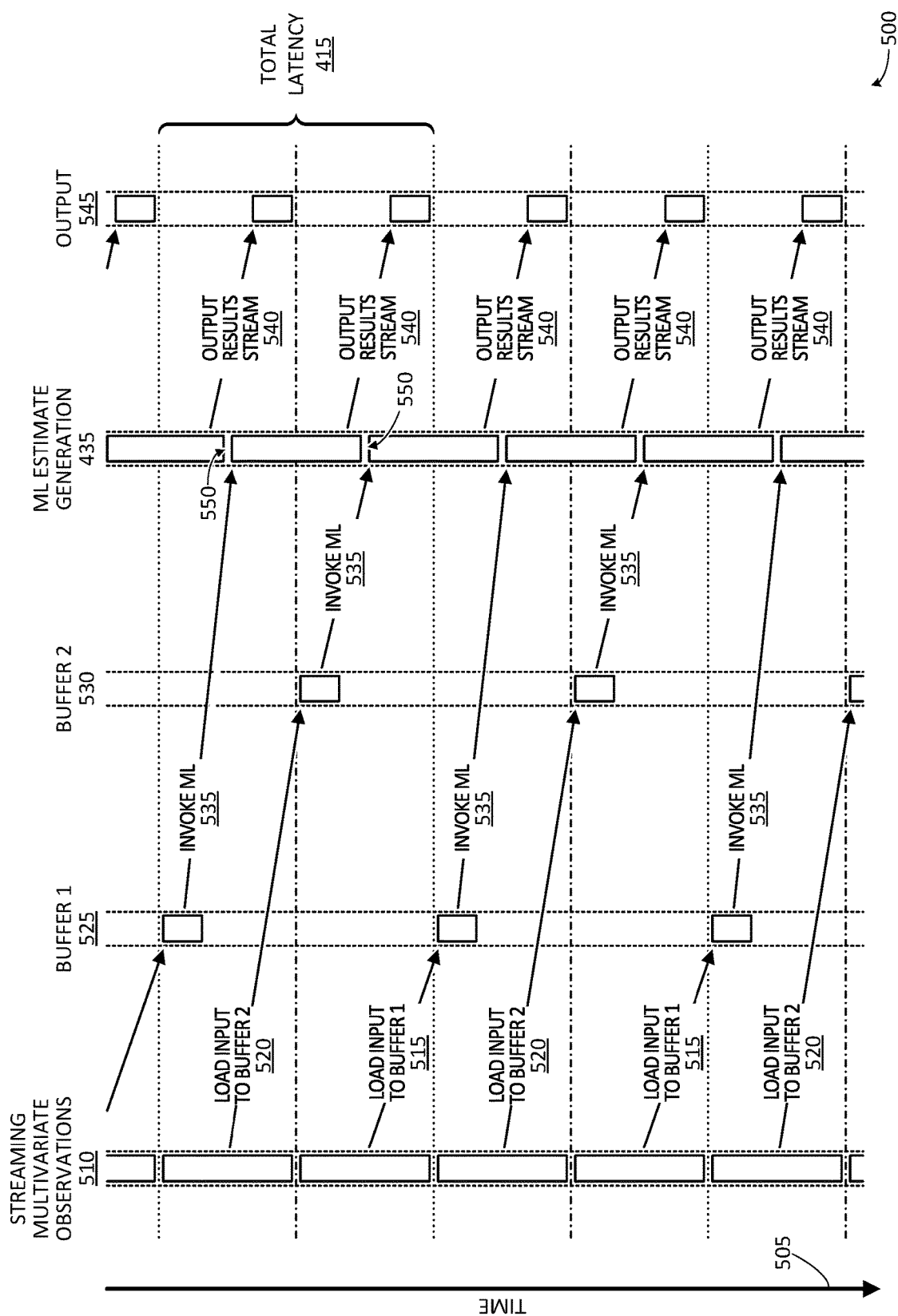
FIG. 5 shows an example demonstration of latencies in a dual-buffer approach in a timing chart.

FIG. 5 shows an example demonstration of latencies in a dual-buffer approach in a timing chart 500. Timing chart 500 illustrates how the dual-buffer approach hides the latency for the read and write operations by alternating loading and processing pointers between the dual buffers that make up the circular buffer. In timing chart 500, latencies incurred by various parts of dual-buffer streaming ML analysis are shown plotted against a time axis 505.

Sensor(s) continuously produce streaming multivariate observations 510 for storage in a memory. In the total latency period 415 the system switches between loading input to buffer 1 515 in the memory and loading input to buffer 2 520 in the memory. Thus, in the total latency period 415, the system writes a batch (the amount to fill a buffer) of input observations alternately to a first buffer of the circular buffer, buffer 1 525, and to a second buffer of the circular buffer, buffer 2 530. In the total latency period 415, the system invokes ML 535 analysis of the buffered observations in both buffer 1 525 and buffer 2 530 by the ML estimate generation 435 process. And, in the total latency period 415, the system outputs a results stream 540 for both buffer 1 525 and buffer 2 530 in an output 545 process. For example, the ML estimates and corresponding input observations from both buffer 1 525 and buffer 2 530 are written-out to the output stream.

In this way, loading buffers 515, 520, and output of the results stream 540 are performed in parallel with ML estimate generation, hiding the I/O latencies within the ML processing latency. And, idle time between batches of ML estimate generation is reduced or eliminated (as shown at reference 550).

—Overview of Multivariate ML Anomaly Detection—

In general, multivariate ML modeling techniques used for ML anomaly detection predict or estimate what each signal should be or is expected to be based on the other signals in a database or collection of time series signals. The predicted signal may be referred to as the "estimate". A multivariate ML anomaly detection model is used to make the predictions or estimates for individual variables based on the values provided for other variables. For example, for Signal 1 in a database of N signals, the multivariate ML anomaly detection model will compute an estimate for Signal 1 using signals 2 through N.

In one embodiment, the ML anomaly detection model may be a non-linear non-parametric (NLNP) regression algorithm used for multivariate anomaly detection. Such NLNP regression algorithms include auto-associative kernel regression (AAKR), and similarity-based modeling (SBM) such as the multivariate state estimation technique (MSET) (including Oracle's proprietary Multivariate State Estimation Technique (MSET2)). In one embodiment, the ML anomaly detection model may be another form of algorithm used for multivariate anomaly detection, such as a neural network (NN), Support Vector Machine (SVM), or Linear Regression (LR).

In one embodiment, the ML anomaly detection model is trained to produce estimates of what the values of variables should be based on training with time series readings (such as time series signals) that represent normal or correct operation of a monitored asset. The training process involves iteratively optimizing a configuration of the ML model until the ML model consistently predicts expected values for the training portion of the individual signal that match (within an acceptable tolerance) the actual values of the training portion of the individual signal. To train the ML anomaly detection model, the time series readings are used to adjust the ML anomaly detection model. A configuration of correlation patterns between the variables of the ML anomaly detection model is automatically adjusted based on values of the time series readings so as to cause the ML anomaly detection model to produce accurate estimates for each variable based on inputs to other variables. Sufficient accuracy of estimates to conclude determine the ML anomaly detection model to be sufficiently trained may be determined by residuals being minimized below a pre-configured training threshold. A residual is a difference between an actual value (such as a measured, observed, sampled, or resampled value) and an estimate, reference, or prediction of what the value is expected to be. At the completion of training, the ML anomaly detection model has learned correlation patterns between variables.

Following training, the ML anomaly detection model may be used to monitor time series readings. Subtracting an actual, measured value for each signal from a corresponding estimate gives the residuals or differences between the values of the signal and estimate. Where there is an anomaly in a signal, the measured signal value departs from the estimated signal value. This causes the residuals to increase, triggering an anomaly alarm. Thus, the residuals are used to detect such anomalies where one or more of the residuals indicates such a departure, for example by becoming consistently excessively large.

For example, the presence of an anomaly may be detected by a sequential probability ratio test (SPRT) analysis of the actual and estimated values for a signal. In one embodiment, the SPRT calculates a cumulative sum of the log-likelihood ratio for each successive residual between an actual value for a signal and an estimated value for the signal, and compares the cumulative sum against a threshold value indicating anomalous deviation. Where the threshold is crossed, an anomaly is detected, and an electronic alert indicating the anomaly may be generated.

—Electronic Alerts—

In one embodiment, an electronic alert may be generated and sent in response to a detection of an anomalous signal value. In one embodiment, an electronic alert is generated by composing and transmitting a computer-readable message. The electronic alert may be composed and then transmitted for subsequent presentation on a display or other action. In one embodiment, the computer readable message may be composed by populating a template data structure with content describing the anomaly. The computer readable message may include content describing an anomaly that triggered the alert, such as a timestamp or observation at which the anomaly was detected, an indication of the signal value that caused the anomaly, an identification of variable (in the multivariate set of variables) for which the anomaly occurred, and a target asset for which the alert is applicable.

In one embodiment, the electronic alert is a message that is configured to be transmitted over a network, such as a wired network, a cellular telephone network, wi-fi network, or other communications infrastructure. The electronic alert may be configured to be read by a computing device. The electronic alert may be configured as a request (such as a REST request) used to trigger initiation of an automated function in response to detection of an anomaly in a variable.

In one embodiment, the automated function is configured to adjust the physical state or activity of the asset or component of the asset that is associated with the cluster, such as by triggering reduction of power to (e.g., slowdown or shutdown) to the asset or component of the asset. In one embodiment, these responses can be provided in real-time, due to the automated buffer fitting process enabling transition of multivariate analysis to streaming operation, thereby timely mitigating or preventing degradation or damage to the asset. In one embodiment, the alert may trigger a maintenance response, for example by automatically draining and replacing lubricants for the asset, or automatically scheduling manual service and/or repair of the asset. In one embodiment, the electronic alert may be presented in a user interface such as a graphical user interface (GUI) by extracting the content of the electronic alert by a REST API that has received the electronic alert. The GUI may present a message, notice, or other indication that the status of operation of a specific machine, asset component, or other signal source has entered (or left) an anomalous state of operation.

—Cloud or Enterprise Embodiments—

In one embodiment, the present system (such as circular buffer fitting system 100) is a computing/data processing system including a computing application or collection of distributed computing applications for access and use by other client computing devices that communicate with the present system over a network. In one embodiment, circular buffer fitting system 100 is a component of a time series data service that is configured to gather, serve, and execute operations on time series data. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment, circular buffer fitting system 100 is a centralized server-side application that provides at least the functions disclosed herein and that is accessed by many users by way of computing devices/terminals communicating with the computers of circular buffer fitting system 100 (functioning as one or more servers) over a computer network. In one embodiment circular buffer fitting system 100 may be implemented by a server or other computing device configured with hardware and software to implement the functions and features described herein.

In one embodiment, the components of circular buffer fitting system 100 may be implemented as sets of one or more software modules executed by one or more computing devices specially configured for such execution. In one embodiment, the components of circular buffer fitting system 100 are implemented on one or more hardware computing devices or hosts interconnected by a data network. For example, the components of circular buffer fitting system 100 may be executed by network-connected computing devices of one or more computing hardware shapes, such as central processing unit (CPU) or general-purpose shapes, dense input/output (I/O) shapes, graphics processing unit (GPU) shapes, and high-performance computing (HPC) shapes.

In one embodiment, the components of circular buffer fitting system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of circular buffer fitting system 100 may (i) generate or compose an electronic message or signal to issue a command or request to another component, (ii) transmit the message or signal to other components of circular buffer fitting system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by circular buffer fitting system 100, for example through a web interface server. In one embodiment, the remote computing system may send requests to and receive responses from circular buffer fitting system 100. In one example, access to the information or applications may be effected through use of a web browser on a personal computer or mobile device. In one example, communications exchanged with circular buffer fitting system 100 may take the form of remote representational state transfer (REST) requests using JavaScript object notation (JSON) as the data interchange format for example, or simple object access protocol (SOAP) requests to and from XML servers. The REST or SOAP requests may include API calls to components of circular buffer fitting system 100.

—Software Module Embodiments—

In general, software instructions are designed to be executed by one or more suitably programmed processors accessing memory. Software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Computing Device Embodiment—

Figure 6:
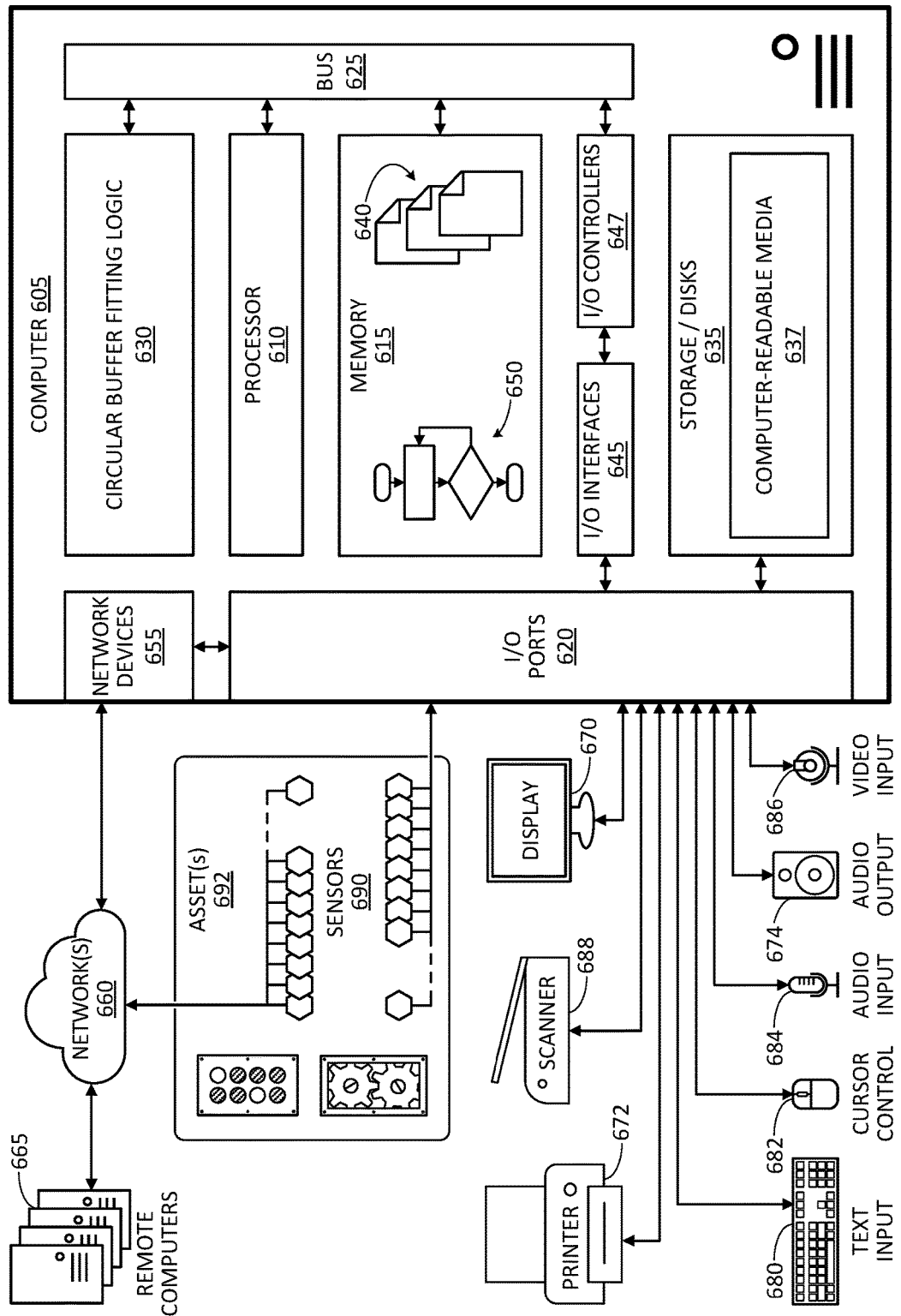
FIG. 6 illustrates an embodiment of a computing system configured with the example systems and/or methods disclosed.

FIG. 6 illustrates an example computing system 600 that is configured and/or programmed as a special purpose computing device(s) with one or more of the example systems and methods described herein, and/or equivalents. The example computing device may be a computer 605 that includes at least one hardware processor 610, a memory 615, and input/output ports 620 operably connected by a bus 625. In one example, the computer 605 may include circular buffer fitting logic 630 configured to facilitate automatic configuration of a circular buffer for ingesting a stream and generating ML estimates in real-time, similar to the circular buffer fitting system 100, circular buffer fitting method 200, and buffer configuration method 300 shown in and described with reference to FIGS. 1-5 above.

In different examples, the logic 630 may be implemented in hardware, one or more non-transitory computer-readable media 637 with stored instructions, firmware, and/or combinations thereof. While the logic 630 is illustrated as a hardware component attached to the bus 625, it is to be appreciated that in other embodiments, the logic 630 could be implemented in the processor 610, stored in memory 615, or stored in disk 635.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application-specific integrated circuit (ASIC) programmed to facilitate automatic configuration of a circular buffer for ingesting a stream and generating ML estimates in real-time. The means may also be implemented as stored computer executable instructions that are presented to computer 605 as data 640 that are temporarily stored in memory 615 and then executed by processor 610.

Logic 630 may also provide means (e.g., hardware, non-transitory computer-readable medium that stores executable instructions, firmware) for performing one or more of the disclosed functions and/or combinations of the functions.

Generally describing an example configuration of the computer 605, the processor 610 may be a variety of various processors including dual microprocessor and other multiprocessor architectures. A memory 615 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 635 may be operably connected to the computer 605 via, for example, an input/output (I/O) interface (e.g., card, device) 645 and an input/output port 620 that are controlled by at least an input/output (I/O) controller 647. The disk 635 may be, for example, a magnetic disk drive, a solid-state drive, a floppy disk drive, a tape drive, a Zip drive, a flash memory card, a memory stick, and so on. Furthermore, the disk 635 may be a compact disc ROM (CD-ROM) drive, a CD recordable (CD-R) drive, a CD rewritable (CD-RW) drive, a digital video disc ROM (DVD ROM) drive, and so on. The storage/disks thus may include one or more non-transitory computer-readable media. The memory 615 can store a process 650 and/or a data 640, for example. The disk 635 and/or the memory 615 can store an operating system that controls and allocates resources of the computer 605.

The computer 605 may interact with, control, and/or be controlled by input/output (I/O) devices via the input/output (I/O) controller 647, the I/O interfaces 645, and the input/output ports 620. Input/output devices may include, for example, one or more network devices 655, displays 670, printers 672 (such as inkjet, laser, or 3D printers), audio output devices 674 (such as speakers or headphones), text input devices 680 (such as keyboards), cursor control devices 682 for pointing and selection inputs (such as mice, trackballs, touch screens, joysticks, pointing sticks, electronic styluses, electronic pen tablets), audio input devices 684 (such as microphones or external audio players), video input devices 686 (such as video and still cameras, or external video players), image scanners 688, video cards (not shown), disks 635, and so on. The input/output ports 620 may include, for example, serial ports, parallel ports, and USB ports.

The computer 605 can operate in a network environment and thus may be connected to the network devices 655 via the I/O interfaces 645, and/or the I/O ports 620. Through the network devices 655, the computer 605 may interact with a network 660. Through the network 660, the computer 605 may be logically connected to remote computers 665. Networks with which the computer 605 may interact include, but are not limited to, a local area network (LAN), a wide area network (WAN), and other networks.

In one embodiment, the computer 605 may be connected to sensors 690 through I/O ports 620 or networks 660 in order to receive information about physical states of monitored machines, devices, systems, facilities, or other apparatuses (collectively referred to as "assets" 692) and components thereof. The assets 692 generally include any type of device, machinery or facility with components that perform measurable activities. For example, an asset may be an aircraft, motor vehicle, ship, oil refinery, power plant, manufacturing facility, machine tool, computer server, or other system, as well as the various components of such systems such as an engine, motor, hydraulic system, turbine, furnace, pump, fan, or other components. In one embodiment, sensors 690 may be operably connected or affixed to assets 692 or otherwise configured to detect and physical phenomena occurring in or around the asset 692. The sensors 690 may produce time series signals of readings taken from the asset 692. The sensors 690 may be network-connected sensors. Assets 692 with network-connected sensors may be referred to as Internet of Things (IOT)-connected devices. The network connection of the sensors 690 and networks 660 may be wired or wireless.

In one embodiment, the sensors 690 include one or more vibration sensors, such as single- and/or multi-axial accelerometers, microphones, piezoelectric, or other vibration sensors that are configured to register physical vibration, such as mechanical oscillation, occurring in and around asset 692. In one embodiment, the sensors 690 may also include (but are not limited to): a temperature sensor (such as a thermocouple or resistive temperature detector), a voltage sensor, a current sensor, a pressure sensor, a rotational speed sensor, a flow meter sensor, a speedometer or other speed sensor, an airspeed sensor or anemometer, an electromagnetic radiation sensor such as an antenna, a proximity sensor, a gyroscope, an inclinometer, a global positioning system (GPS) sensor, a fuel gauge, a torque sensor, a flex sensor, a nuclear radiation detector, or any of a wide variety of other sensors or transducers for generating electrical signals that represent sensed physical phenomena, for example physical phenomena occurring in or around asset 692.

In one embodiment, computer 605 is configured with logic, such as software modules, to collect readings from sensors 690 and store them as observations in a time series data structure such as a time series database. In one embodiment, the computer 605 polls sensors 690 to retrieve sensor telemetry readings. In one embodiment, the sensor telemetry readings may be a time series of multivariate observations (for example structured as vectors) that includes sensed values for a plurality of the sensors 690. In one embodiment, the computer 605 passively receives sensor telemetry readings actively transmitted by sensors 690. For example, the sensor telemetry readings may be transmitted in a real time stream to the computer 605 from the sensors 690. In one embodiment, the ongoing time series database is stored in batches of observations in a circular buffer, as discussed above. In one embodiment, the computer 605 receives one or more collections, sets, or databases of sensor telemetry readings previously collected from sensors 690, for example from storage 635 or from remote computers 665.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. One or more non-transitory computer-readable media that include stored thereon computer-executable instructions that when executed by at least a processor of a computer system cause the computer system to:
    load a stream of multivariate time series observations into a circular buffer at a real-time pace of input from a target asset, wherein the circular buffer is configured with a buffer configuration that specifies a length of the circular buffer and whether the circular buffer is arranged as a single-buffer or dual-buffer;
    adjust the length of the circular buffer in a memory until generation of machine learning estimates of the multivariate time series observations that are in the circular buffer satisfies a threshold test for generation at the real-time pace; and
    at the real time pace, (i) load additional multivariate time series observations into the circular buffer that is in the adjusted length and (ii) generate additional machine learning estimates of the additional multivariate time series observations.

2. The non-transitory computer-readable media of claim 1, wherein the computer-executable instructions to adjust the length of the circular buffer in the memory causes the computer system to iteratively test the generation of the additional machine learning estimates with incremental decreases of the length of the circular buffer arranged as the single-buffer and as the dual-buffer until the threshold test is satisfied.

3. The non-transitory computer-readable media of claim 2, wherein the computer-executable instructions to adjust the length of the circular buffer in the memory causes the computer system to, when the length of the circular buffer reaches a pre-determined minimum:
    downsample the stream of multivariate time series observations; and
    reset the length of the circular buffer to a pre-determined maximum.

4. The non-transitory computer-readable media of claim 1, wherein the threshold test for the generation of the machine learning estimates at the real time pace is remaining within a maximum for observations missed, wherein the computer-executable instructions further cause the computer system to:
    generate the machine learning estimates of the multivariate time series observations that are in the circular buffer;
    write the estimates in an output stream as they are generated;
    detect a count of the multivariate time series observations that are missed based on absence of estimates that correspond to the multivariate time series observations; and
    determine that the threshold test for generation at the real-time pace is satisfied based on comparing the count of the multivariate time series observations that are missed with the maximum for observations missed.

5. The non-transitory computer-readable media of claim 1, further comprising instructions that when executed by at least the processor cause the computer system to:
    detect an anomaly between the additional multivariate time series observations and the additional machine learning estimates in real time; and
    in response to detection of the anomaly, generate an electronic alert in real time.

6. The non-transitory computer-readable media of claim 1, wherein the additional multivariate time series observations are from the target asset.

7. The non-transitory computer-readable media of claim 1, wherein the additional multivariate time series observations are from an asset that is of similar construction to the target asset.

8. A configurable circular buffer system for streaming multivariate estimation, comprising:
    a circular buffer that is configured to load a stream of multivariate time series observations at a real-time pace of input from a target asset, wherein the circular buffer is configured with a buffer configuration that specifies a length of the circular buffer and whether the circular buffer is arranged as a single-buffer or dual-buffer;
    an estimate generator that is configured to generate machine learning estimates of the multivariate time series observations that are in the circular buffer; and
    a buffer configurator that is configured to adjust the length of the circular buffer in a memory until generation of the machine learning estimates of the multivariate time series observations that are in the circular buffer satisfies a threshold test for generation at the real-time pace.

9. The configurable circular buffer system of claim 8, wherein the buffer configurator is further configured to iteratively test the generation of machine learning estimates with incremental decreases of the length of the circular buffer arranged as the single-buffer and as the dual-buffer until the threshold test is satisfied.

10. The configurable circular buffer system of claim 9, wherein the buffer configurator is further configured to to, when the length of the circular buffer reaches a pre-determined minimum:
    downsample the stream of multivariate time series observations; and
    reset the length of the circular buffer to a pre-determined maximum.

11. The configurable circular buffer system of claim 8, wherein the buffer configurator is further configured to determine that the threshold test is satisfied based on a count of observations that are missed by the estimate generator.

12. The configurable circular buffer system of claim 8, further comprising an anomaly detector that is configured to:
   detect an anomaly between additional time series observations and corresponding additional machine learning estimates in real time; and
   in response to detection of the anomaly, generate an electronic alert in real time.

13. The configurable circular buffer system of claim 8, wherein the estimate generator further comprises a multivariate state estimation technique model that is configured to generate the machine learning estimates to be consistent with expected values for multivariate observations of the target asset.

14. A computer-implemented method, comprising:
   configuring a circular buffer with a buffer configuration that specifies a length of the circular buffer and whether the circular buffer is arranged as a single-buffer or dual-buffer;
   loading a stream of multivariate time series observations into the circular buffer at a real-time pace of input from a target asset;
   adjusting the length of the circular buffer in a memory until generation of machine learning estimates of the multivariate time series observations that are in the circular buffer satisfies a threshold test for generation at the real-time pace; and
   at the real-time pace,
      (i) loading additional multivariate time series observations into the circular buffer that has the adjusted length and
      (ii) generating additional machine learning estimates of the additional multivariate time series observations.

15. The computer-implemented method of claim 14, wherein adjusting the length of the circular buffer in a memory further comprises iteratively testing the generation of machine learning estimates with incremental decreases of the length of the circular buffer arranged as the single-buffer and as the dual-buffer until the threshold test is satisfied.

16. The computer-implemented method of claim 15, wherein adjusting the length of the circular buffer in a memory further comprises:
   detecting that the length of the circular buffer has reached a pre-determined minimum;
   setting the stream of multivariate time series observations to be downsampled; and
   resetting the length of the circular buffer to a pre-determined maximum.

17. The computer-implemented method of claim 14, wherein the threshold test for generation at the real time pace is remaining within a maximum for observations missed, the method further comprising:
   generating the machine learning estimates of the multivariate time series observations that are in the circular buffer;
   writing the estimates in an output stream as they are generated;
   detecting a count of the multivariate time series observations that are missed based on absence of estimates that correspond to the multivariate time series observations; and
   determining that the threshold test for generation at the real-time pace is satisfied based on comparing the count of the multivariate time series observations that are missed with the maximum for observations missed.

18. The computer-implemented method of claim 14, further comprising
   detecting an anomaly between the additional multivariate time series observations and the additional machine learning estimates in real time; and
   in response to detection of the anomaly, generating an electronic alert in real time.

19. The computer-implemented method of claim 14, further comprising:
   training a multivariate state estimation technique model to produce estimates that are consistent with what multivariate observations of the target asset are expected to be; and
   generating the machine learning estimates of the multivariate time series observations that are in the circular buffer using the trained multivariate state estimation technique model.

20. The computer-implemented method of claim 14, further comprising, while loading the additional multivariate time series observations and generating the additional machine learning estimates:
   load the additional multivariate time series observations into an alternative configuration of the circular buffer at the real time pace;
   adjust the alternative configuration until generation of additional machine learning estimates from the additional multivariate time series observations satisfies the threshold test;
   compare the alternative configuration to the adjusted buffer configuration having the adjusted length; and
   in response to a difference between the adjusted buffer configuration and the alternative configuration, update the adjusted buffer configuration to the alternative configuration.

\* \* \* \* \*